United States Patent
Jain et al.

(10) Patent No.: US 12,519,517 B2
(45) Date of Patent: Jan. 6, 2026

(54) ENABLING RELIABLE MILLIMETER-WAVE LINKS USING MULTI-BEAM, PRO-ACTIVE TRACKING, AND PHASED ARRAYS DESIGNS

(71) Applicant: The Regents of the University of California, Oakland, CA (US)

(72) Inventors: Ish Kumar Jain, San Diego, CA (US); Dinesh Bharadia, San Diego, CA (US); Tejas Sadarahalli, Oakland, CA (US); Raghav Subbaraman, San Diego, CA (US)

(73) Assignee: The Regents of the University of California, Oakland, CA (US)

( * ) Notice: Subject to any disclaimer, the term of this patent is extended or adjusted under 35 U.S.C. 154(b) by 348 days.

(21) Appl. No.: 18/040,722

(22) PCT Filed: Aug. 6, 2021

(86) PCT No.: PCT/US2021/045099
§ 371 (c)(1),
(2) Date: Feb. 6, 2023

(87) PCT Pub. No.: WO2022/032190
PCT Pub. Date: Feb. 10, 2022

(65) Prior Publication Data
US 2023/0327715 A1    Oct. 12, 2023

Related U.S. Application Data

(60) Provisional application No. 63/062,315, filed on Aug. 6, 2020.

(51) Int. Cl.
H04B 7/06 (2006.01)
H04B 7/0408 (2017.01)

(52) U.S. Cl.
CPC ......... *H04B 7/0617* (2013.01); *H04B 7/0408* (2013.01); *H04B 7/0671* (2013.01); *H04B 7/06952* (2023.05)

(58) Field of Classification Search
None
See application file for complete search history.

(56) References Cited

U.S. PATENT DOCUMENTS

2009/0116444 A1* 5/2009 Wang ............... H04B 7/0408
370/329
2015/0341095 A1   11/2015 Yu et al.
(Continued)

OTHER PUBLICATIONS

3rd Generation Partnership Project; "Technical Specification Group Services and System Aspects; Study on enhancement of 3GPP Support for 5G V2X Services," (Relase 15), 3GPP TR 22.886 V15.3.0 (Sep. 2018), 58 pages.
(Continued)

*Primary Examiner* — Minh Trang T Nguyen
(74) *Attorney, Agent, or Firm* — FisherBroyles, LLP

(57) ABSTRACT

A method, a system, and a computer program product for enabling reliable millimeter links in wireless communications systems. One or more beams associated with a plurality of communication paths is trained to determine one or more angles corresponding to the beams at which the beams are received by at least one of a first communication device and a second communication device. Using the determined one or more angles, at least one communication path in the plurality of communication paths is selected for transmission of one or more data packets between the first and second communication devices. Using the selected communication path, one or more data packets are transmitted.

20 Claims, 14 Drawing Sheets

(56) References Cited

U.S. PATENT DOCUMENTS

| | | |
|---|---|---|
| 2017/0195909 A1 | 7/2017 | Tujkovic |
| 2019/0253899 A1 | 8/2019 | Shi et al. |
| 2019/0289568 A1 | 9/2019 | Pajovic et al. |
| 2019/0341986 A1 | 11/2019 | Raghavan et al. |

OTHER PUBLICATIONS

3rd Generation Partnership Project; "5G; NR; Physical layer procedures for data (3GPP TS 38.214 V15.3.0 Release 15)," ETSI TS 138 214 V15.3.0 (Oct. 2018), 99 pages.
Abari, O. et al., "Enabling high-quality untethered virtual reality," In 14th {USENIX} Symposium on Networked Systems Design and Implementation ({NSDI} 17), pp. 531-544, 2017.
Abari, O. et al., "Millimeter wave communications: From point-to-point links to agile network connections," In HotNets, pp. 169-175, 2016.
Airfide 5G Mobile Wireless Access (MWA). https://airfidenet.com/, Sep. 2019.
Alkhateeb, A. et al., "Channel estimation and hybrid precoding for millimeter wave cellular systems," IEEE Journal of Selected Topics in Signal Processing, 8(5):831-846, 2014.
Analog Devices, AD-FMCDAQ2-EBZ. https://wiki.analog.com/resources/eval/user-guides/ad-fmcdaq2-ebz, Sep. 2019.
Analog Devices, KCU 105. https://www.xilinx.com/products/boards-and-kits/kcu105.html, Sep. 2019.
Anderson, C. R. et al., "In-building wideband partition loss measurements at 2.5 and 60 ghz," IEEE transactions on wireless communications, 3(3):922-928, 2004.
Aykin, I. et al., "MAMBA: A multi-armed bandit framework for beam tracking in millimeter-wave systems," In 2020 IEEE Conference on Computer Communications (INFOCOM). IEEE, 2020.
Barati, C. N. et al., "Directional initial access for millimeter wave cellular systems," In Signals, Systems and Computers, 2015 49th Asilomar Conference on, pp. 307-311. IEEE, 2015.
Barati, C. N. et al., "Initial access in millimeter wave cellular systems," IEEE Transactions on Wireless Communications, 15(12):7926-7940, 2016.
Cinetics axis-360 motion control system. https://cinetics.com/axis360-pro/, Sep. 2019.
Driscoll, T. et al., "Enabling mobile augmented and virtual reality with 5g networks," Technical report, Tech. Rep., Jan. 2017.
Genc, Z. et al., "Robust 60 ghz indoor connectivity: Is it possible with reflections?" In 2010 IEEE 71st vehicular technology conference, pp. 1-5. IEEE, 2010.
Giordani, M. et al. "A Tutorial on Beam Management for 3GPP NR at mmWave Frequencies." arXiv preprint arXiv:1804.01908 (2018).
Grant, M. et al., "CVX: Matlab software for disciplined convex programming, version 2.1," http://cvxr.com/cvx, Mar. 2014.
Haider, M. K. et al., "Listeer: Mmwave beam acquisition and steering by tracking indicator leds on wireless aps," In Proceedings of the 24th Annual International Conference on Mobile Computing and Networking, pp. 273-288. ACM, 2018.
Hassanieh, H. et al., "Fast millimeter wave beam alignment," In Proceedings of the 2018 Conference of the ACM Special Interest Group on Data Communication, pp. 432-445. ACM, 2018.
IDT. F5280: Transmit/Receive Half Duplex IC 25GHz to 31GHz. https://www.idt.com/products/rf-products/phased-array-beamformers/ f5280-transmitreceive-half-duplex-ic-25ghz-31ghz, Sep. 2019.
IEEE 802.11ad: Enhancements for Very High Throughput in the 60 GHz Band. IEEE, 2009. (Available at https://standards.ieee.org/ieee/802.11ad/4527/). 628 pages.
Jeong, C. et al., "Random access in millimeter-wave beam-forming cellular networks: issues and approaches," IEEE Communications Magazine, 53(1):180-185, 2015.
Ji, H. et al., "Ultra-reliable and low-latency communications in 5g downlink: Physical layer aspects," IEEE Wireless Communications, 25(3):124-130, 2018.
Jog, S. et al., "Many-to-many beam alignment in millimeter wave networks," In 16th {USENIX} Symposium on Networked Systems Design and Implementation ({NSDI} 19), pp. 783-800, 2019.
Khawaja, W. et al. "Coverage Enhancement for mmWave Communications using Passive Reflectors." arXiv e-prints (2018): arXiv-1803.
MacCartney, G. R. et al., "Rapid fading due to human blockage in pedestrian crowds at 5g millimeter-wave frequencies," In GLOBECOM 2017-2017 IEEE Global Communications Conference, pp. 1-7. IEEE, 2017.
Mini-Circuits ZFHP-3800ff-S+. https://www.minicircuits.com/pdfs/ ZFHP-3800FF-S+.pdf, Sep. 2019.
Mini-Circuits ZX60-P103LN+. https://www.minicircuits.com/pdfs/ZX60-P103LN+.pdf, Sep. 2019.
Narayanan, A. et al., "A first measurement study of commercial mmwave 5g performance on smartphones," arXiv preprint arXiv:1909.07532, 2019.
Nitsche, T. et al., "Steering with eyes closed: mm-wave beam steering without in-band measurement," In 2015 IEEE Conference on Computer Communications (INFOCOM), pp. 2416-2424. IEEE, 2015.
Palacios, J. "Adaptive Codebook Optimization for Beam Training on Off-the-Shelf IEEE 802.11ad Devices," In Proceedings of the 24rd Annual International Conference on Mobile Computing and Networking. ACM, 2018.
Pasternack PE9851/2F-10. https://www.everythingrf.com/products/waveguide-horn-antennas/pasternack-enterprises-inc/ 617-20-pe9851-2f- 10, Sep. 2019.
Qian, F. et al., "Flare: Practical viewport-adaptive 360-degree video streaming for mobile devices," In Proceedings of the 24th Annual International Conference on Mobile Computing and Networking, pp. 99-114, 2018.
Qiao, J. et al., "Mac-layer concurrent beamforming protocol for indoor millimeter-wave networks," IEEE Transactions on Vehicular Technology, 64(1):327-338, 2014.
Qorvo, RFFC5071A: 85—4200 MHz Wideband Synthesizer / VCO with Integrated 6 GHz RF Mixer. (Available at https://www.qorvo.com/products/p/RFFC5071A) 27 pages, Sep. 2019.
Rappaport, T. S. et al., "38 ghz and 60 ghz angle-dependent propagation for cellular & peer-to-peer wireless communications," In 2012 IEEE international conference on communications (ICC), pp. 4568-4573. IEEE, 2012.
Rappaport, T. S. et al., "Broadband millimeter-wave propagation measurements and models using adaptive-beam antennas for outdoor urban cellular communications," IEEE transactions on antennas and propagation, 61(4):1850-1859, 2012.
Rappaport, T. S. et al., "Millimeter wave mobile communications for 5G cellular: It will work!" IEEE Access, 1:335-349, May 2013.
Samimi, M. K. et al., "Characterization of the 28 ghz millimeter-wave dense urban channel for future 5g mobile cellular," NYU Wireless TR, 1, 2014.
Sayeed, A. M. et al., "Maximizing MIMO capacity in sparse multipath with reconfigurable antenna arrays," IEEE Journal of Selected Topics in Signal Processing, 1(1):156-166, 2007.
Shao, S. et al., "Two-dimensional reduction of beam training overhead in crowded 802.11 ad based networks," In IEEE Infocom 2018—IEEE Conference on Computer Communications Workshops (Infocom Wkshps), pp. 680-685. IEEE, 2018.
Sur, S. et al., "60 GHz indoor networking through flexible beams: A link-level profiling," In ACM SIGMETRICS Performance Evaluation Review, vol. 43, pp. 71-84. ACM, 2015.
Sur, S. et al., "Beamspy: enabling robust 60 GHz links under blockage," In 13th {USENIX} Symposium on Networked Systems Design and Implementation ({NSDI} 16), pp. 193-206, 2016.
Sur, S. et al., "Towards scalable and ubiquitous millimeter-wave wireless networks," In Proceedings of the 24th Annual International Conference on Mobile Computing and Networking, pp. 257-271. ACM, 2018.
Sur, S. et al., "WiFi-assisted 60 GHz wireless networks," In Proceedings of the 23rd Annual International Conference on Mobile Computing and Networking, pp. 28-41. ACM, 2017.

(56) References Cited

OTHER PUBLICATIONS

Talon AD7200 Multi-Band Wi-Fi Router. (Available at https://www.tp-link.com/us/home-networking/wifi-router/ad7200/) 7 pages, Sep. 2019.

Tan, X. et al., "Enabling indoor mobile millimeter-wave networks based on smart reflect-arrays," In IEEE Infocom 2018—IEEE Conference on Computer Communications, pp. 270-278. IEEE, 2018.

Tsang, Y. et al., "Coding the Beams: Improving Beamforming Training in mmWave Communication System." arXiv preprint arXiv:1104.1007 (2012).

Tse, D. et al., "Fundamentals of wireless communication," Cambridge University press, 2005.

Va, V. et al., "Beam switching for millimeter wave communication to support high speed trains," In 2015 IEEE 82nd Vehicular Technology Conference (VTC2015-Fall), pp. 1-5. IEEE, 2015.

Wei, T. et al., "Facilitating robust 60 GHz network deployment by sensing ambient reflectors," In 14th {USENIX} Symposium on Networked Systems Design and Implementation ({NSDI} 17), pp. 213-226, 2017.

Wei, T. et al., "Pose information assisted 60 GHz networks: Towards seamless coverage and mobility support," In Proceedings of the 23rd Annual International Conference on Mobile Computing and Networking, pp. 42-55. ACM, 2017.

Zhang, D. et al., "mmchoir: Exploiting joint transmissions for reliable 60ghz mmwave wlans," In Proceedings of the Eighteenth ACM International Symposium on Mobile Ad Hoc Networking and Computing, pp. 251-260. ACM, 2018.

Zhao, M. et al., "Improving the robustness of 60 ghz indoor connectivity by deployment of mirrors," In 2018 IEEE 29th Annual International Symposium on Personal, Indoor and Mobile Radio Communications (PIMRC), pp. 188-193. IEEE, 2018.

Zhou, A. et al., "Autonomous environment mapping using commodity millimeter-wave network device," In IEEE Infocom 2019—IEEE Conference on Computer Communications, pp. 1126-1134. IEEE, 2019.

Zhou, A. et al., "Beam-forecast: Facilitating mobile 60 GHz networks via model-driven beam steering," In IEEE Infocom 2017—IEEE Conference on Computer Communications, pp. 1-9. IEEE, 2017.

Zhou, A. et al., "Following the shadow: Agile 3-D beam-steering for 60 GHz wireless networks," In IEEE Infocom 2018—IEEE Conference on Computer Communications, pp. 2375-2383. IEEE, 2018.

Zhou, A. et al., "Robot navigation in radio beam space: Leveraging robotic intelligence for seamless mmwave network coverage," In Proceedings of the Twentieth ACM International Symposium on Mobile Ad Hoc Networking and Computing, pp. 161-170. ACM, 2019.

Zhou, L. et al., "Efficient codebook-based MIMO beamforming for millimeter-wave WLANs," In Personal Indoor and Mobile Radio Communications (PIMRC), 2012 IEEE 23rd International Symposium on, pp. 1885-1889. IEEE, 2012.

Zhou, X. et al., "Mirror mirror on the ceiling: Flexible wireless links for data centers," ACM SIGCOMM Computer Communication Review, 42(4):443-454, 2012.

Zhu, Y. et al., "Demystifying 60ghz outdoor picocells," In Proceedings of the 20th annual international conference on Mobile computing and networking, pp. 5-16. ACM, 2014.

Ghasempour, Y. et al., "Multi-User Multi-Stream mmWave WLANs With Efficient Path Discovery and Beam Steering," IEEE Journal on Selected Areas in Communications, vol. 37, No. 12, Dec. 2019, pp. 2744-2758.

* cited by examiner

ENABLING RELIABLE MILLIMETER-WAVE LINKS USING MULTI-BEAM, PRO-ACTIVE TRACKING, AND PHASED ARRAYS DESIGNS

CROSS-REFERENCE TO RELATED APPLICATIONS

This application is a national stage entry of Patent Cooperation Treaty Application No. PCT/US2021/045099 filed Aug. 6, 2021, entitled "ENABLING RELIABLE MILLIMETER-WAVE LINKS USING MULTI-BEAM, PRO-ACTIVE TRACKING, AND PHASED ARRAYS DESIGNS," which claims priority to U.S. Provisional Patent Appl. No. 63/062,315 filed Aug. 6, 2020, entitled "ENABLING RELIABLE MILLIMETER LINKS USING MULTI-BEAM PRO-ACTIVE TRACKING," the disclosures of which are incorporated herein by reference in their entirety.

STATEMENT OF GOVERNMENT SPONSORED SUPPORT

This invention was made with government support under CNS1925767 awarded by the National Science Foundation. The government has certain rights in the invention.

TECHNICAL FIELD

The subject matter disclosed herein relates to data processing, and in particular to using multi-beam proactive tracking to enable reliable millimeter links in wireless communications systems, e.g., 5G wireless communications system.

BACKGROUND

Millimeter wave communications in 5G New Radio wireless communications systems provide high data rates for various applications, such as V2X, VR, factory automation, autonomous driving, etc. These types of communications suffer from signal degradation because of frequent blockages and beam misalignment due to user mobility, and thus, are seldom reliable. To establish a reliable connection, beam training is frequently performed to find alternate paths and re-align the beam with a mobile user. Beam training process consumes a substantial portion of channel air-time and is reactive (i.e., triggered after the communications link has been degraded significantly), thus, leading to prolonged outage events.

SUMMARY

In some implementations, the current subject matter relates to a computer-implemented method for enabling reliable millimeter links in wireless communications systems. The method may include training one or more beams associated with a plurality of communication paths to determine one or more angles corresponding to the beams at which the beams are received by at least one of a first communication device and a second communication device. The method may include selecting, using the determined one or more angles (and/or at least one of a phase and an attenuation associated with one or more trained beams), at least one communication path in the plurality of communication paths for transmission of one or more data packets between the first and second communication devices. The selection may be made based on a maximum signal-to-noise (SNR) power. The method may also include transmitting one or more data packets using the selected communication path.

In some implementations, the current subject matter may include one or more of the following optional features. The plurality of communication paths may include at least one of the following: a direct communication path, a reflected communication path, a repeater path, a relay path, a reflecting surface, a smart reflecting surface, and any combination thereof. The reflected communication path may be configured to be established between the first communication device, the second communication device and at least one reflector device, where the reflector device may be configured to reflect at least one beam from at least one of the first and second communication devices for receipt by at least another one of the first and second communication devices.

In some implementations, the first and second communication devices may include at least one of the following: a user equipment, a base station, an antenna, and any combination thereof. In some implementations, the plurality of communication paths may be configured to be established in a wireless communication system.

In some implementations, the training operation may be configured to be performed based on at least one of the following: a rotational movement of at least one of the first and second communication devices, a translational movement of at least one of the first and second communication devices, a blocking object positioned between the first and second communication devices, and any combination thereof. The training may include at least one of the following: adjusting a power associated with the one or more beams, adjusting a phase associated with the one or more beams, adjusting a delay associated with the one or more beams, and any combination thereof.

In some implementations, the selecting operation may include selecting a first plurality of communication paths in the plurality of communication paths. The method may also include combining signals transmitted in each of the communication paths in the first plurality of communication paths as received at at least one of the first and second communication devices.

In some implementations, the selecting may also include determining one or more beamforming weights for maximizing a signal-to-noise power associated with each of one or more communication paths in the plurality of communication paths, where the beamforming weights may be determined using a transmit power and a noise power associated with each of communication paths and may be determined using the associated delay, phase and/or attenuation. The selecting may further include selecting the communication path having a maximum signal-to-noise power.

In some implementations, the first and second communication devices may be communicating using a millimeter wave.

In some implementations, the method may further include detecting, at least one of the first and second communication devices, a loss of a signal associated with one or more trained beams, and determining, based on the detected loss of the signal, a location of at least another of the first and second communication devices. The loss of the signal may be determined based on a change in at least one of an amplitude, a phase and a delay associated with the one or more trained beams.

In some implementations, at least one of the first and second communication devices is configured to generate the one or more beams. For example, one or both of the base station and the user equipment may generate beams as well as perform the processes discussed herein.

In some implementations, each communication path in the plurality of communication paths may be associated with a delay. The transmission of data packets may be performed by compensating the delay associated with each communication path. The delay may be a variable delay.

In some implementations, at least one of the first and second communication devices may include a phased array antenna device configured to perform at least one of the following: the training, the selecting, the transmitting of the data packets, a receiving of the data packets, and any combination thereof. These operations may be performed using at least one of the following parameters: a variable delay, a constant delay, a variable attenuation, a constant attenuation, a variable phase, a constant phase, and any combination thereof. The phased array antenna device may include one or more phased array antennas, one or more variable attenuators, and variable phase shifters, the variable phase shifters being communicatively coupled to a radio frequency signal.

Implementations of the current subject matter can include, but are not limited to, systems and methods consistent including one or more features are described as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to optical edge detection, it should be readily understood that such features are not intended to be limiting. The claims that follow this disclosure are intended to define the scope of the protected subject matter.

DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 5c is a schematic that illustrates advantages of the delay compensation system shown in FIG. 5a;

DETAILED DESCRIPTION

One or more implementations of the current subject matter relate to methods, systems, articles of manufacture, and the like that may, among other possible advantages, provide an ability to use multi-beam proactive tracking to enable reliable millimeter links in wireless communications systems, e.g., 5G wireless communications system.

In some implementations, the current subject matter relates to a millimeter wave wireless communications system (mmWave system). The current subject matter's mmWave system may be configured to provide an increased reliability and high-data-rate millimeter wave communications links through use of multipath diversity in various environmental reflections. Such reflections may be strong for mmWave system and may be configured to sustain the communication link even if the direct path between a source and a target (e.g., a transmitter device and a user equipment, respectively, and vice versa) is occluded and/or unavailable to establish an independent link.

Figure 1:
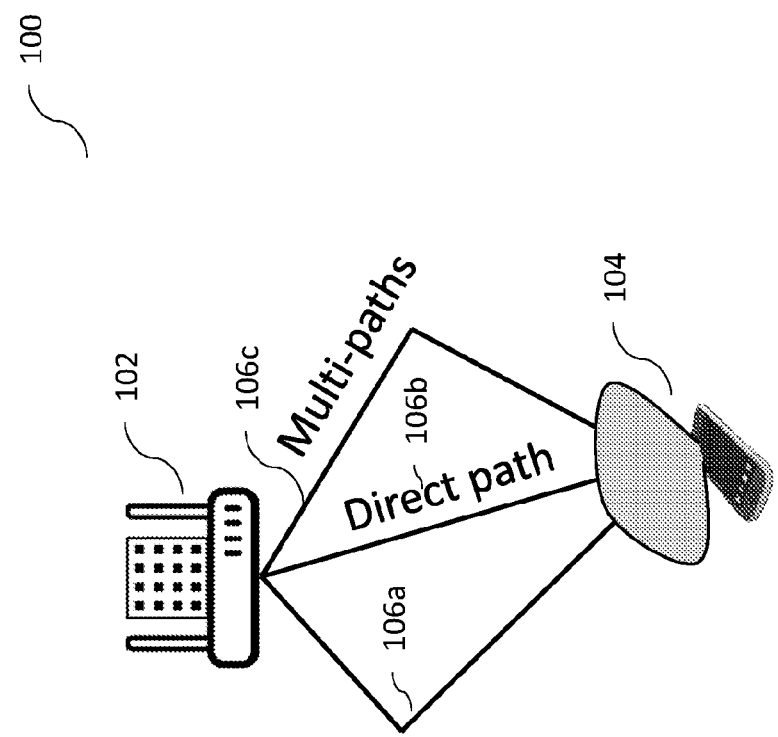
FIG. 1 illustrates an exemplary multi-path communications system, according to some implementations of the current subject matter.

The mmWave system may be configured to use single radio frequency (RF) chain and a phased array to generate custom beam patterns with multiple directional beams (multi-beam) that may each be aligned toward direct path(s), reflected path(s), repeater path(s), relay path(s), reflecting surface(s), smart reflecting surface(s), and/or any other paths/surfaces, as shown, for example, in FIG. 1. FIG. 1 illustrates an exemplary multi-path communications system 100, according to some implementations of the current subject matter. The system 100 may be configured to include a first communications device (e.g., a base station, an antenna) 102 and a second communications device 104 (e.g., a user equipment). The devices 102 and 104 may be communicatively coupled using one or more communications links or beams 106 (a, b, c), where link 106b may be considered a direct path communications link and links 106a and 106c may be additional multi-path communications links communicatively coupling devices 102, 104. In view of the multiple communications links or beams connecting devices 102, 104, the probability of multiple beams simultaneously facing a blockage may be low, thereby reducing the possibility of link outage and increasing reliability of communications between devices 102, 104.

The system 100 may be further configured to split a single beam into a multi-beam, thereby also reducing power radiated per beam to conserve the total radiated power (TRP). The signal that may be received by one or more of the devices 102, 104 from the other device may be equal to the sum of multiple copies of the transmitted signal, e.g., one from every beam in a multi-beam as shown in FIG. 1. The copies of signals may be constructively added at the receiver device (e.g., device 102), where the received power and/or throughput may be increased to a value higher than that of a single beam, while keeping TRP constant.

By way of a non-limiting example, assuming that the system 100 includes two paths, and two beams may be aligned along those two-channel paths, where path loss may be unity for each path, and the signal traveled along each path may incur the same phase, the transmitter device may be configured to split the total power of $a^2$ equally into two beams with power of $$\frac{a^2}{\sqrt{2}}$$

on each beam, i.e., amplitude $$\frac{a}{\sqrt{2}}$$

on each beam, which may propagate through the channel and may be received at a receiver (e.g., an omni-receiver). Since the phase may be aligned for both paths, the received signal may be added in a signal domain, thus, the total amplitude of the received signal may be determined as $$\frac{a}{\sqrt{2}} + \frac{a}{\sqrt{2}} = \sqrt{2}\,a.$$

The received signal, upon converting to signal-to-noise ratio (SNR) may be proportional to $2a^2$. This is in contrast to traditional mmWave single-beam link that does not exploit the second path and provides an SNR proportional to $a^2$, which is lower than the multi-beam case. As such, higher SNR may result in lower bit error rates and allow higher modulation and coding schemes, thereby leading to higher throughput for multi-beam.

In some implementations, the system 100 may be configured to execute a process for establishing a constructive multi-beam link, having, for example, a low-overhead. To achieve constructive multi-beam, the system 100 may be configured to estimate one or more optimal beam directions, beam-phase, and/or power per beam. Here, the system 100 may be configured to determine one or more beam directions and estimate a per beam power and phase. The system 100 may be configured to first determine directions of strong paths in the wireless communications environment (e.g., paths that may be viable for communication) during a mandatory beam-training phase. Then, the system 100, using additional channel probes (e.g., two) per viable beam, the system 100 may determine an optimal power and/or phase that may be applied to each beam in the multi-beam communication. For example, because only a few (e.g., 2, 3, etc.) viable beams may exist in a typical communications environment due to the sparse nature of reflection clusters in a millimeter wave environment, the system 100's algorithmic overhead may be configured to remain fixed and independent of the number of elements in the antenna array of devices 102 and/or 104.

Once a constructive multi-beam has been established, the system 100 may be configured to continuously maintain it, even in view of wireless channel changes, such as, for example, blockages and/or mobility of user equipment (e.g., device 104). Link blockages may completely occlude one or more beams of a multi-beam. Further, mobility may adversely affect the established links by causing misalignment between transmit and/or receive beams, thereby degrading throughput and/or reliability. The system 100 may be configured to address these challenges. Specifically, the system 100 may be configured to execute a beam-maintenance algorithm, which may proactively realigns each of the beam parameters (e.g., direction, phase, and/or amplitude) in a multi-beam environment and may continuously maintain its constructive nature. The system 100 may be configured to use a super-resolution algorithm to separate properties of individual beams from their sum. Then, the system may use estimated per beam properties, to measure power loss and determine an underlying cause, e.g., blockage and/or mobility. Instead of waiting for beams to degrade, the system 100 may proactively make this determination and optimize per-beam properties, as well as maintain constructive multi-beam.

Figure 2:
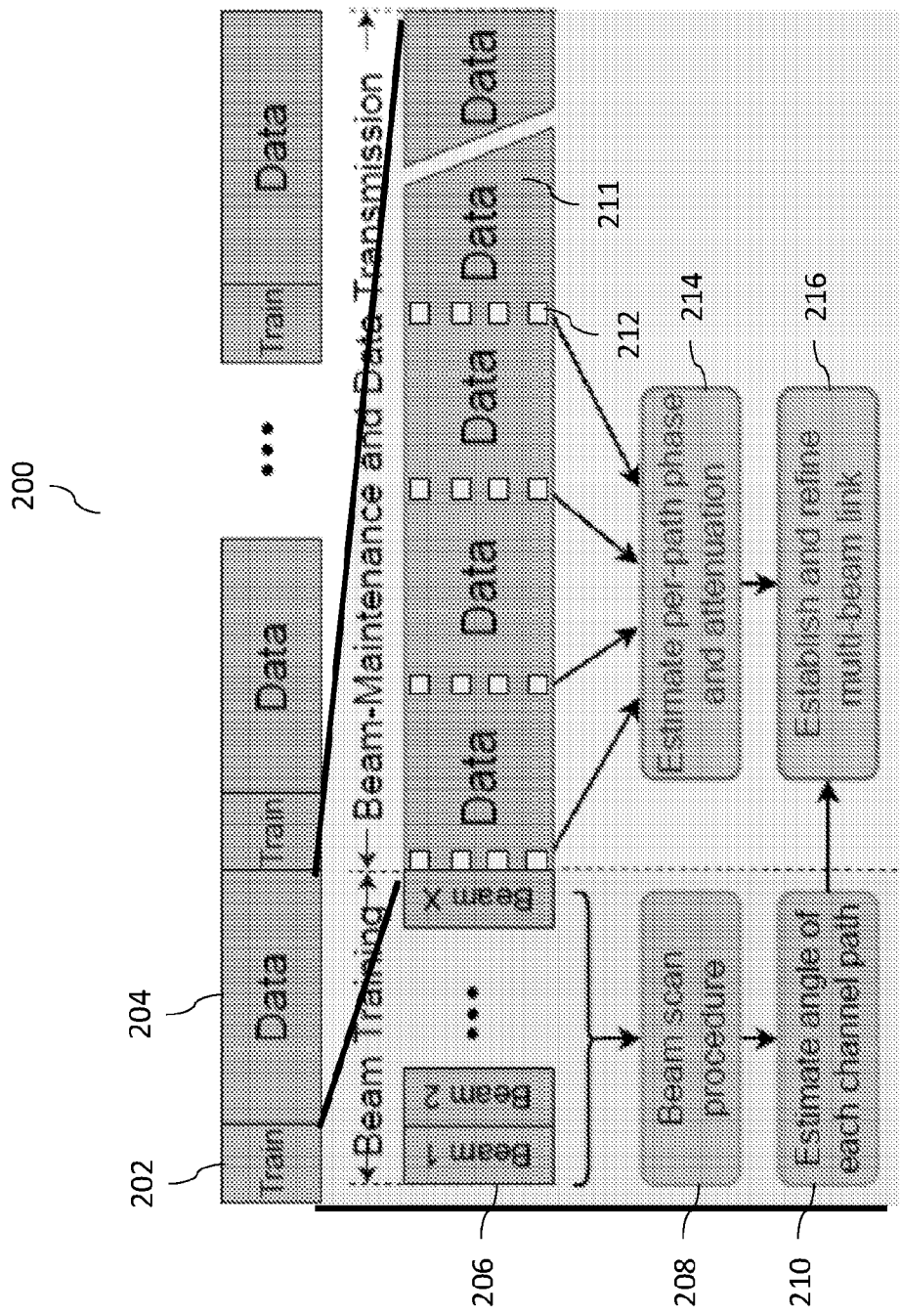
FIG. 2 illustrates an exemplary process for determining one or more parameters in a constructive multi-beam environment, according to some implementations of the current subject matter.

FIG. 2 illustrates an exemplary process 200 for determining one or more parameters in a constructive multi-beam environment, according to some implementations of the current subject matter. The constructive multi-beam environment may be channel-dependent and may depend on at least one of the following parameters: a number of paths, angles of the paths, relative phase(s), attenuation(s), and/or any combination thereof. As shown in FIG. 2, the process 200 may include one or more beam training stages 202 and one or more beam maintenance and data transmission stages 204. During the beam training stage 202, one or more beams 206 (e.g., beam 1, beam 2, etc.) may be trained using any known beam-training procedure 208 to determine an angle of each path, at 210. The determined angle of each path of each beam may be provided to the stage 204.

Once beam-training stage 202 is completed, the process 200 may proceed to the beam maintenance and data transmission stage 204. During this stage, the transmitted data 211 may be separated by one or more reference signals 212. The reference signals 212 may be used to determine per-path phase and attenuation, at 214. The determined per-path phase and attenuation may be used together with estimate angle of each path to establish and refine, at 216, each multi-beam link in the system 100 (shown in FIG. 1), which may allow the system 100 to maintain an optimal constructive multi-beam regardless of any blockages, user mobility, and/or any other interference.

In some implementations, a link reliability may be defined as a fraction of time when the link is available for communication within an observation interval. Link outage (e.g., due to various effects) and/or procedures, such as, beam-training may reduce reliability as they temporarily render the link unavailable for communication. Thus, the link reliability may be expressed as:

$$\text{Reliability}=1-\text{Prob(Outage)} \tag{1}$$

The probability of an outage may be determined as a fraction of a duration where the SNR is below a minimum threshold. The directional nature of single-beam millimeter wave links make them susceptible to link outages since blockage, user mobility, etc. effects may reduce SNR by up to 30 dB. Current subject matter's multi-beam system may be configured to prevent these outages by avoiding a single point of failure.

Multi-beam links may be reliable even under an impact of blockage events. Assuming a blockage probability $\beta$ ($0 \leq \beta \leq 1$) represents a fraction of time a communication link is in an outage state during the observation interval and the beams in the multi-beam system are blocked independently, the probability that beams simultaneously experience an outage is $\beta^k$. The reliability will be $1-\beta$ for the single-beam case and $1-\beta^k$, $k \geq 2$ for the multi-beam case. Multi-beam may provide higher reliability because it prevents the link from suffering an outage due to blockage, unlike a single-beam. Multi-beam links may be sustained as long as there is at least one unblocked path to the receiver and thus are more reliable than single-beam links.

Moreover, a multi-beam link environment with optimal constructive combining and power-control may provide a higher throughput than a single-beam link. To achieve this, the current subject matter system may include a multi-antenna base station configured for transmission data to a user device/equipment using a millimeter wave link and determine an optimal beamforming solution that may maximize the received SNR.

I. Multi-Beam Throughput Model

In some implementations, the system 100 may be configured to determine one or more beamforming weights at a multi-antenna base-station (e.g., a gNodeB or gNB phased array) that may be communicating with a single antenna receiver using millimeter wave (e.g., multi-antenna receiver, as discussed below). The base station may be configured to use a uniform linear phased array with N antenna elements. Beamforming may be implemented by applying a N×1 beam weights vector w at each antenna using a combination of phase shifters and attenuators.

Figure 3A:
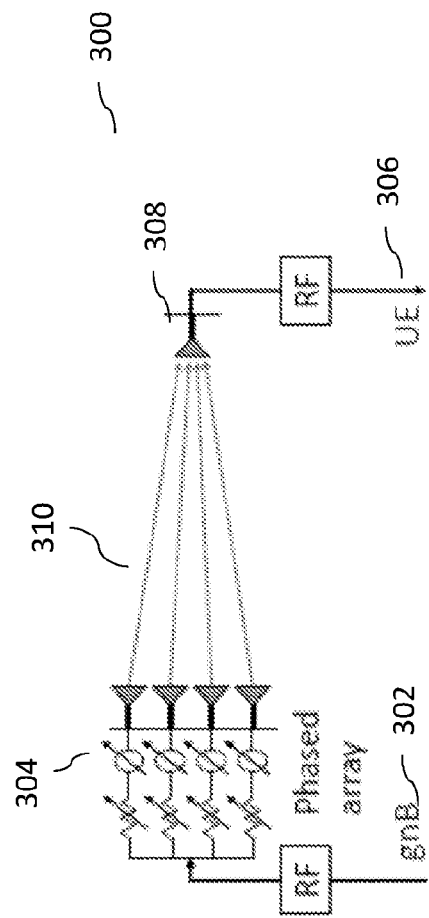
FIG. 3a illustrates an exemplary single-path wireless communications system.

FIG. 3a illustrates an exemplary single-path wireless communications system 300. The system 300 may include a base station 302 configured to transmit an RF signal to its phased antenna array 304. The phased antenna array 304 may be configured to transmit via a single path 310 signals to the receiver antenna 308 of the user equipment device 306.

Figure 3B:
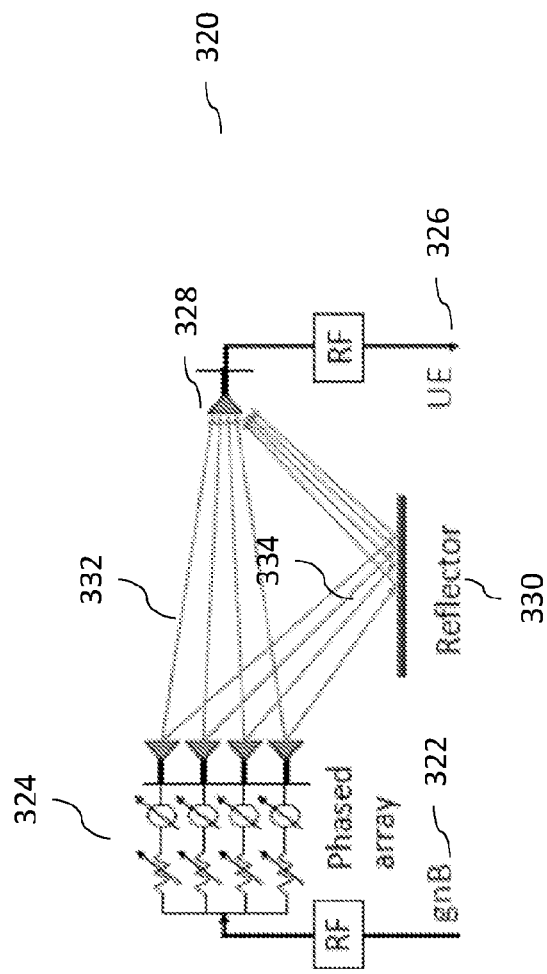
FIG. 3b illustrates an exemplary multi-beam wireless communication system that may be optimal for a multipath channel, according to some implementations of the current subject matter.
Figure 3C:
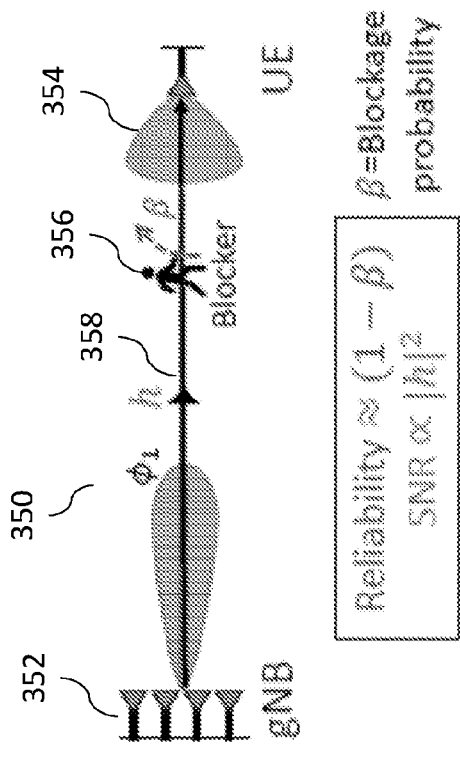
FIG. 3c illustrates a wireless communication system that includes a base station and a user equipment communicatively coupled to the base station, where a blocker is blocking the single path.
Figure 3D:
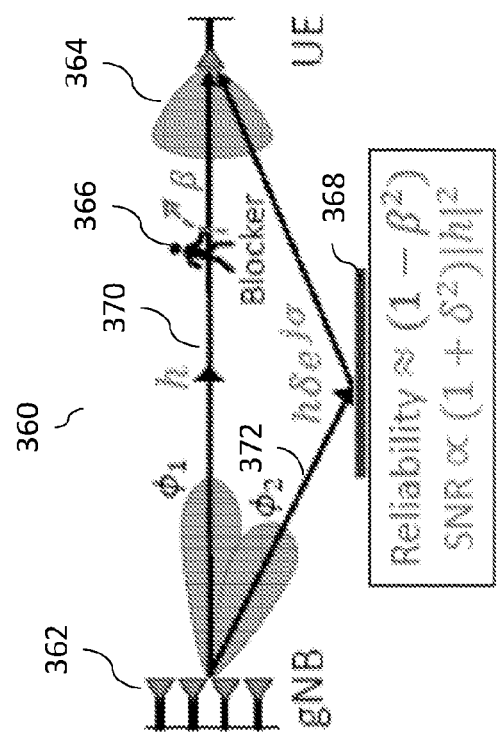
FIG. 3d illustrates an exemplary wireless communication system implementing multipath channel(s), according to some implementations of the current subject matter.
Figure 3E:
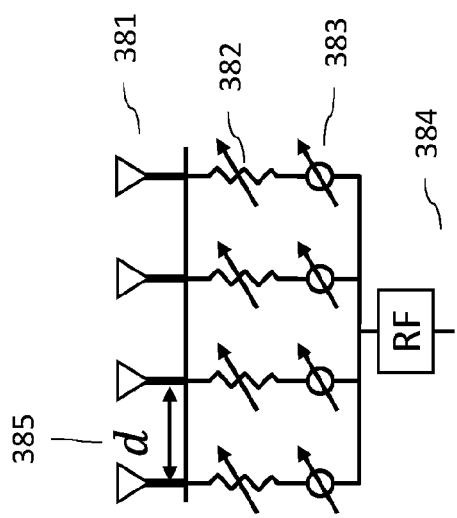
FIG. 3e illustrates an exemplary phased antenna array system.

An exemplary phased antenna array system 380 is shown in FIG. 3e. The system 380 may be configured to include an radio frequency component or an RF chain 384 (a single RF chain 384 is shown in FIG. 3e, but, as can be understood, multiple RF chains may be used). The system 380 may also include multiple phased array antennas 381 separated by a predetermined distance d 385 (the distance 385 between antennas 381 may be the same or may vary). Further, each antenna 381 may be coupled to a variable attenuator 382, which is in turn, coupled to a variable phase shifter 383 connected to the RF chain 384.

Referring back to FIG. 3a, assuming s is a transmit signal from the base station 302, the received signal y may be expressed as follows:

$$y = h^T w s + \eta \tag{2}$$

where h is N×1 channel from N transmit antennas 304 to one receive antenna 306 and $\eta$ is white Gaussian noise at the receiver.

The capacity or maximum throughput of a wireless link may be evaluated in terms of SNR (the ratio of signal power to noise power) as follows:

$$\text{SNR} = \|h^T w\|^2 P_s / P_\eta \tag{3}$$

where $P_s$ is the average transmit power (without transmit array gain) and $P_\eta$ is the noise power.

In some implementations, the current subject matter system may be configured to determine beamforming weight(s) w so that the SNR is maximized. Using Cauchy-Schwartz inequality, it follows that $\|h^T w\|$ is maximized when h* (complex conjugate of h) and w align in vector space. As such, an optimal weight vector may be channel-dependent. The weight vector may cancel phases in the channel and generate an inner-product form that maximizes an absolute value of their product. Further, the weights may be unitary to keep the power constant, i.e., $\|w\|=1$. Thus, the optimal weights $w^{opt}$ may be determined as follows:

$$w^{opt} = h^*/\|h\| \tag{4}$$

Thus, an optimal beamforming may cause generation of highest SNR of $$\frac{\|h\|^2 P_s}{P_\eta}.$$

In practice, a wireless channel, including a millimeter wave channel, may include multiple paths (e.g., direct and/or reflected paths). Thus, the optimal beam-forming vector depends on the channel h and may be affected by the nature of the paths.

In some cases, a single-beam may be optimal for a single-path channel. The single-path channel vector may be represented by $h^{single}$. A single-path channel may be defined by the following parameters: a direction of departure $\phi_1$ and a complex attenuation h using the following:

$$h^{single}[n] = h e^{-j 2\pi \frac{d}{\lambda}(n-1)\sin(\phi_1)} \tag{5}$$

where n is a transmit-antenna index, d is an antenna spacing, and $\lambda$ is a wavelength of carrier frequency (d=λ/2 in the phased array). Using equations (4) and (5), the optimal weights for this channel may be obtained using $$w_{\phi_1} = \frac{h^{single}}{\|h^{single}\|},$$

which may be simplified as follows:

$$w_{\phi_1} = \frac{1}{\sqrt{N}}\left[1, e^{j2\pi\frac{d}{\lambda}sin(\phi_1)}, \ldots, e^{j2\pi(N-1)\frac{d}{\lambda}sin(\phi_1)}\right]^T \quad (6)$$

FIG. 3b illustrates an exemplary multi-beam wireless communication system 320 that may be optimal for a multipath channel, according to some implementations of the current subject matter. The system 320 may include a base station 322 (e.g., gNB) configured to transmit an RF signal to its phased antenna array 324. The phased antenna array 324 may be configured to transmit, via multiple paths 332 and 334 (as can be understood, more than two paths may be used), signals to the receiver antenna 328 of the user equipment device 326. A reflector 330 may be used for reflection of the path 334 from the phased antenna array 324 to the receiver 328.

Assuming that h is the complex attenuation of the path 332. The second path 334's attenuation may be expressed as $h\delta e^{j\sigma}$, where $\delta \in R^+$ and $\sigma \in [0, 2\pi]$ are respectively the relative attenuation and phase shift of the second path 334 with respect to the first path 332. The two-path channel attenuation may be determined as follows: predetermined distance d 385 (the distance 385 between antennas 381 may be the same or may vary). Further, each antenna 381 may be coupled to a variable attenuator 382, which is in turn, coupled to a variable phase shifter 383 connected to the RF chain 384.

Referring back to FIG. 3a, assuming s is a transmit signal from the base station 302, the received signal y may be expressed as follows:

$$y = h^T w s + \eta \quad (2)$$

where h is N×1 channel from N transmit antennas 304 to one receive antenna 306 and η is white Gaussian noise at the receiver.

The capacity or maximum throughput of a wireless link may be evaluated in terms of SNR (the ratio of signal power to noise power) as follows:

$$SNR = \|h^T w\|^2 P_s/P_\eta \quad (3)$$

where $P_s$ is the average transmit power (without transmit array gain) and $P_\eta$ is the noise power.

In some implementations, the current subject matter system may be configured to determine beamforming weight(s) w so that the SNR is maximized. Using Cauchy-Schwartz inequality, it follows that $\|h^T w\|$ is maximized when h* (complex conjugate of h) and w align in vector space. As such, an optimal weight vector may be channel-dependent. The weight vector may cancel phases in the channel and generate an inner-product form that maximizes an absolute value of their product. Further, the weights may be unitary to keep the power constant, i.e., $\|w\|=1$. Thus, the optimal weights $w^{opt}$ may be determined as follows:

$$w^{opt} = h^*/\|h\| \quad (4)$$

Thus, an optimal beamforming may cause generation of highest SNR of $\|h\|^2 P_s/P_\eta$. In practice, a wireless channel, including a millimeter wave channel, may include multiple paths (e.g., direct and/or reflected paths). Thus, the optimal beam-forming vector depends on the channel h and may be affected by the nature of the paths.

In some cases, a single-beam may be optimal for a single-path channel. The single-path channel vector may be represented by $h^{single}$. A single-path channel may be defined by the following parameters: a direction of departure $\phi_1$ and a complex attenuation h using the following:

$$h^{single}[n] = h e^{-j2\pi e/\lambda(n-1)sin(\phi_1)} \quad (5)$$

where n is a transmit-antenna index, d is an antenna spacing, and λ is a wavelength of carrier frequency (d=λ/2 in the phased array). Using equations (4) and (5), the optimal weights for this channel may be obtained using $w_{\phi_1} = h^{single*}/\|h^{single}\|$, which may be simplified as follows:

$$w_{\phi_1} = 1/\sqrt{N}[1, e^{j2\pi d/\lambda\ sin(\phi_1)}, \ldots, e^{j2\pi(N-1)d/\lambda\ sin(\phi_1)}]^T \quad (6)$$

FIG. 3b illustrates an exemplary multi-beam wireless communication system 320 that may be optimal for a multipath channel, according to some implementations of the current subject matter. The system 320 may include a base station 322 (e.g., gNB) configured to transmit an RF signal to its phased antenna array 324. The phased antenna array 324 may be configured to transmit, via multiple paths 332 and 334 (as can be understood, more than two paths may be used), signals to the receiver antenna 328 of the user equipment device 326. A reflector 330 may be used for reflection of the path 334 from the phased antenna array 324 to the receiver 328.

Assuming that h is the complex attenuation of the path 332. The second path 334's attenuation may be expressed as $h\delta e^{j\sigma}$, where $\delta \in R^+$ and $\sigma \in [0, 2\pi]$ are respectively the relative attenuation and phase shift of the second path 334 with respect to the first path 332. The two-path channel attenuation may be determined as follows:

$$h^{multi}[n] = h e^{-j2\pi\frac{d}{\lambda}(n-1)sin(\phi_1)} + h\delta e^{j\sigma} e^{-j2\pi\frac{d}{\lambda}(n-1)sin(\phi_2)} \quad (7)$$

where $\phi_1$ and $\phi_2$ are the directions of departure of the paths 332, 334, respectively.

FIG. 3c illustrates a wireless communication system 350 that includes a base station 352 and a user equipment 354 communicatively coupled to the base station 352, where a blocker 356 is blocking the single path 358. Here, no second path is used, thereby causing severe power attenuation along $\phi_2$.

FIG. 3d illustrates an exemplary wireless communication system 360 implementing multipath channel(s), according to some implementations of the current subject matter. The system 360 may include a base station 362 and a user equipment 364 communicatively coupled to the base station 362, where a blocker 366 may be blocking a path 370. However, the system 360 may include a reflector 368 that may be configured for reflecting a path 372 from the base station 362 to the user equipment 364. In this case, optimal weights for the multipath channel may be determined using equation (4) as follows: $w^{multi} = h^{multi*}/\|h^{multi}\|$. Thus, the SNR of the optimal weights may be determined as follows:

$$SNR^{multi} = \|h^{multi}\|^2 P_s/P_\eta \approx (1+\delta^2)|h|^2 P_s/P_\eta \quad (8)$$

In comparison to the single-beam approach, the optimal SNR of the multipath approach is higher by a factor of 1+δ2, which may be configured to provide at least twice as much gain (e.g., 3 dB higher SNR) for two equally strong paths ($\delta=1$). Generally, $w^{multi}$ may be optimal constructive multi-beam weights that may split the transmit signal along both the paths such that they maximally combine at the receiver.

II. Constructive Multi-Beam Generation

To achieve an optimal beamforming, channel's attenuation h[n] may be determined at each antenna at the base station. For example, in sub-6 GHz wireless communications, a channel at each antenna may be measured as each antenna may be connected to a separate RF chain. In contrast, millimeter wave hardware usually may include a single RF chain attached to a phased array with many antennas, thereby making channel estimations for each antenna element difficult millimeter wave systems.

In some implementations, since, in millimeter wave applications, a number of multipath reflections may be sparse, using equation (7), h[n] may be reconstructed using channel measurements on individual multipath directions in the wireless communications environment. Once h[n] is determined, the optimal weights may be determined using equation (4). Referring to FIG. 3d, if the relative attenuation $\delta$ and the relative phase $\sigma$ between each path is measured, a constructive multi-beam weights may be determined as follows:

$$w(\phi_1, \phi_2, \delta, \sigma) = \frac{(w_{\phi_1} + \delta e^{-j\sigma} w_{\phi_2})}{\|(w_{\phi_1} + \delta e^{-j\sigma} w_{\phi_2})\|} \quad (9)$$

In equation (9), the denominator may ensure that the TRP is conserved by enforcing $\|w\|=1$. The current subject matter may then be configured to quantize the beamforming vector phases and amplitudes to be compatible with the phased array. The current subject matter may use phase and amplitude control to generate an optimal channel-dependent multi-beam.

In some implementations, the current subject matter may be configured to determine parameters for constructive multi-beam. In the two-beam case discussed above, parameters $\delta$ (relative attenuation, $\delta \in R^+$) and $\sigma$ (relative phase shift, $0<\sigma<2\pi$) of the reflected path with respect to the direct path. The directions $\phi_1$ and $\phi_2$ of the two paths may be determined from the beam-training phase. A narrow-band complex wireless channel along each path may be denoted as $h_1$ and $h_2$, respectively. If the base station measures both $h_1$ and $h_2$, then it may determine a relative amplitude and phase shift using their ratio. The channel magnitude may remain fixed, which may be used to estimate the channel. Assuming, for example, that $h_1$ is a reference and $h_1 \in R^+$ without loss of generality, the magnitudes $p_1=|h_1|^2$ and $p_2=|h_2|^2$ may be determined from the initial beam-training phase.

Figure 4:
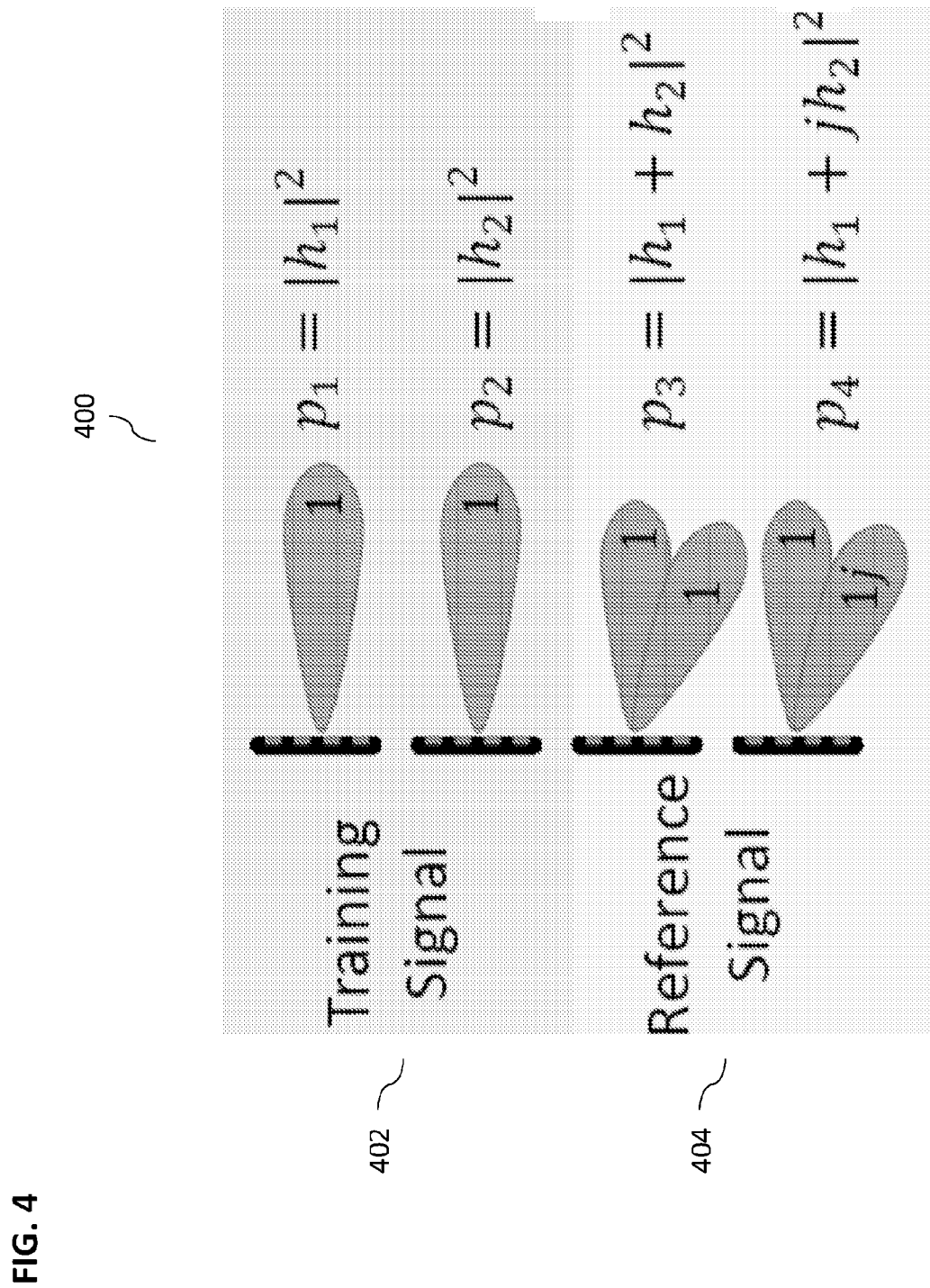
FIG. 4 illustrates an exemplary channel probing process to determine relative attenuation and relative phase shift parameters, according to some implementations of the current subject matter.

FIG. 4 illustrates an exemplary channel probing process 400 to determine relative attenuation and relative phase shift parameters, according to some implementations of the current subject matter. The process 400 may be performed by the system 100 shown in FIG. 1. As such in FIG. 4, two channel probes are shown (any number of channel probes may be used). The process 400 may include two stages: a training signal stage 402 and reference signal stage 404. As shown in FIG. 4, a base station may use two reference signals to probe two 2-beam patterns: first, the base station may set the beam $w(\phi_1, \phi_2, 1, 0)$, and then set $w(\phi_1, \phi_2, 1, \pi/2)$. For each of the two probes, the base station may determine channel magnitudes $p_5$ and $p_4$ as follows:

$$p_3=|h_1+e^{j0}h_2|^2=|h_1|^2+|h_2|^2+2h_1\mathrm{Re}(h_2)$$

$$p_4=|h_1+e^{j\pi/2}h_2|^2=|h_1|^2+|h_2|^2+2h_1\mathrm{Im}(h_2) \quad (10)$$

where $j=\sqrt{-1}$. Using equation (10) above, the base station may determine $h_1$ and $h_2$ individually, as follows:

$$\frac{h_2}{h_1} = \hat{\delta}e^{j\hat{\sigma}} = \frac{p_3 - p_1 - p_2}{2\sqrt{p_1}} + j\frac{p_1 + p_2 - p_4}{2\sqrt{p_1}} \quad (11)$$

where $(\hat{\delta}, \hat{\sigma})$ are estimates of relative amplitude and phase, respectively, between the two multi-beam paths. Thus, the current subject matter may be configured to determine, for example, one or more required parameters using only two consecutive reference probes (as shown by 404 in FIG. 4) for the two-beam case. The process 400 may be generalized to any number K of multi-beams by performing two probes for each additional beam and using equation (11) to determine K−1 relative channels with respect to $h_1$. The current subject matter system may be configured to measure the per-beam channel may use 2(K−1)+K probes for K beams (including the estimates from the beam-training phase) and may be independent of the number of antenna elements in the phased array, thereby, making it usable for large arrays.

In some implementations, the current subject matter system may be used in wideband channel wireless communications environments. In this case, typically, a channel state information (CSI) may be measured across multiple frequency subcarriers over a wide bandwidth. The CSI may already be available and/or extracted using any known means. Thus, the above processes may be applied to multiple subcarriers by treating each subcarrier's channel independently. Assume that $h_1(f)$ and $h_2(f)$ as the wideband CSI across frequency index f. The system 100 may be configured to determine $h_1(f)$ and $h_2(f)$ using equation (11). Then, an average received signal strength may be maximized over all frequencies to jointly determine $(\hat{\delta}, \hat{\sigma})$ using the following:

$$\{\hat{\delta}, \hat{\sigma}\} = \underset{\delta, \sigma}{\mathrm{argmax}} \|h_2(f) - \delta e^{j\sigma}h_1(f)\|^2 \quad (12)$$

Equation (12) may be solved to determine a closed form solution ($<\cdot,\cdot>$ as the inner product over a frequency dimension) using the following:

$$\hat{\delta}e^{j\hat{\sigma}} = \langle h_1(f), h_2(f)\rangle/\|h_1(f)\|^2 \quad (13)$$

Equation (13) may be reduced to $\hat{\delta}e^{j\hat{\sigma}}=h_2/h_1$ for a narrowband channel. The optimal phase, amplitude, and angle may change over time as the user equipment moves. These parameters may be periodically determining using a tracking algorithm discussed below.

Figure 5A:
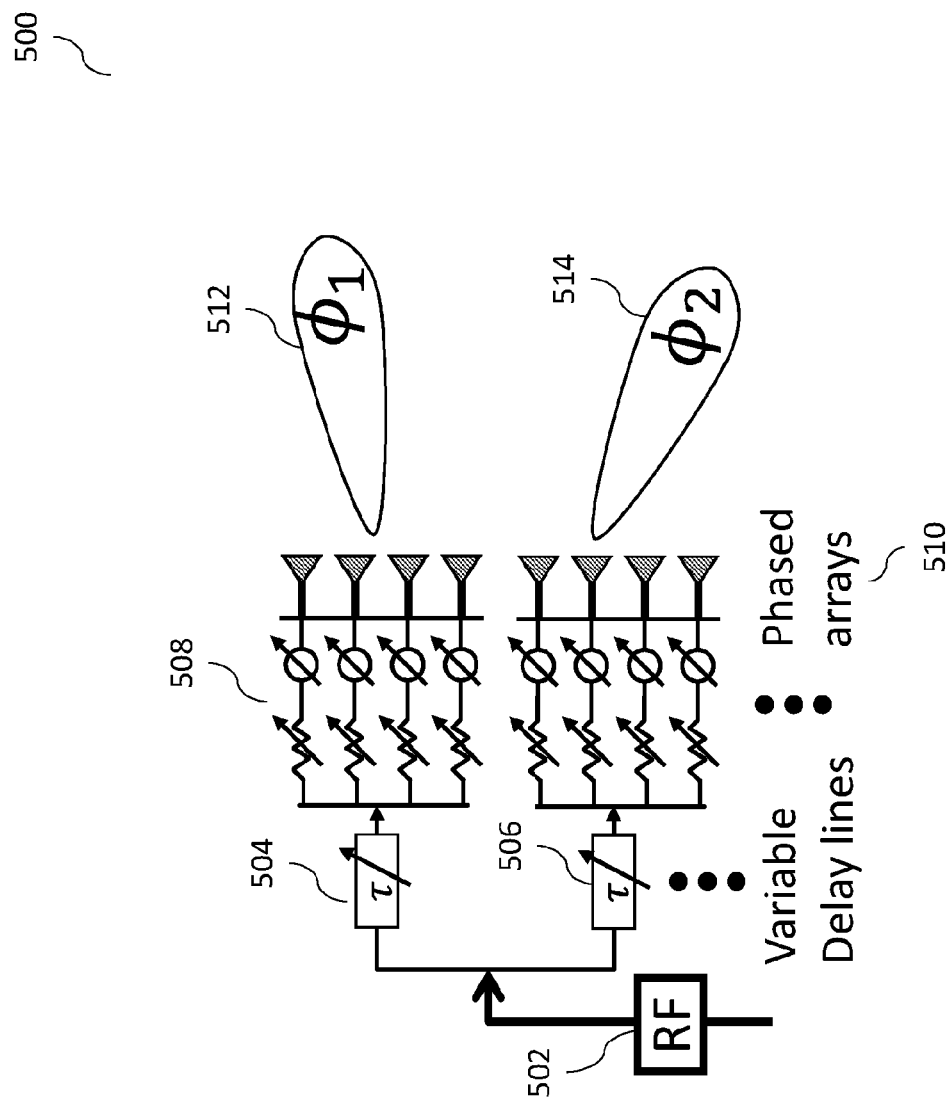
FIG. 5a illustrates an exemplary beamforming system, according to some implementations of the current subject matter.

In some implementations, the current subject matter may be configured to perform true-time delay beamforming for the purposes of wideband (e.g., channel bandwidth) operation. FIG. 5a illustrates an exemplary beamforming system 500, according to some implementations of the current subject matter. The system 500 may be configured to be incorporated and/or include a base station (e.g., gNodeB and/or any other base station). The system 500 may be configured to generate an RF signal 502 that may be supplied to one or more variable delay components/lines 504, 506, each of which may be communicatively coupled to phased antenna arrays 508, 510, respectively. As can be understood, there may be more than one delay line and/or more than one phased antenna array. The phased antenna arrays 508, 510 may be configured to generate beams 512, 514, respectively. Each phased antenna array 508, 510 may be configured to generate a single beam in different directions such that they may be configured to coherently add to a single receiver (as discussed above). As such, the system 500 may be configured to process multi-path channel bandwidth to provide a flat frequency response. Thus, the system 500 may be advantageous in solving wideband issues due to use of multi-path channels.

In a single beam channel, one path causes the same delay at each of the antennas, where a single beam channel is configured to connect from N antenna base station to a single antenna user (assuming the signal direction of departure is ør). At a receiver location, a signal travels a different distance from each of the transmit antenna, which causes a delay in signal arrival as determined using the following:

$$\tau_1(n) = (n-1)\frac{d}{c}\sin(\phi_1) \quad (14)$$

As such, a single beam channel $h^{single}(t, n)$ can be expressed as follows:

$$h^{single}(t, n) = h_1 e^{j2\pi(n-1)\frac{d}{\lambda}\sin(\phi_1)}\delta(t - \tau_1) \quad (15)$$

where the delay $\tau_1$ is a constant for all antennas and can be handled by baseband processing.

As such, an optimal beamformer for a single path channel is a single beam that may be expressed as follows:

$$w_{\phi_1} = \frac{1}{\sqrt{N}}\left[1, e^{j2\pi\frac{d}{\lambda}\sin(\phi_1)}, \ldots, e^{j2\pi(N-1)\frac{d}{\lambda}\sin(\phi_1)}\right]^T \quad (16)$$

As shown in FIG. 5a, the current subject matter may be configured to address a channel bandwidth issue for a multi-channel system, such as system 500. In particular, for a two-delay line system 500 as shown in FIG. 5a, the multi-path channel may include two paths having delays $\tau_1$ 504 and $\tau_2$ 506, and may be expressed as follows:

$$h(t, n) = h_1 e^{j2\pi(n-1)\frac{d}{\lambda}\sin(\phi_1)}\delta(t - \tau_1) + h_2 e^{2\pi(n-1)\frac{d}{\lambda}\sin(\phi_2)}\delta(t - \tau_2) \quad (17)$$

Because there are different delays, the multi-path beamformer may suffer from various wideband issues. The current subject matter system 500, as shown in FIG. 5a, may be configured to resolve such issues. For example, the antennas of the system 500 may be split (or divided) into one or more groups (as shown in FIG. 5a-two groups) of N/2 antennas each. As can be understood, the split in the antennas may be unequal (e.g., one group of antennas may be larger or smaller than another). Each antenna group may be communicatively coupled using a variable delay line. As such, the multi-path beamformer (e.g., two-path beamformer as shown in FIG. 5a) may be expressed as follows:

$$w_{\phi_1,\phi_2}(n)\begin{cases} e^{-j2\pi(n-1)\frac{d}{\lambda}\sin(\phi_1)}\delta(t+\tau_1), & \text{if } n \le N/2 \\ e^{-j2\pi(n-1)\frac{d}{\lambda}\sin(\phi_2)}\delta(t+\tau_2), & \text{if } N/2 < n \le N \end{cases} \quad (18)$$

Figure 5B:
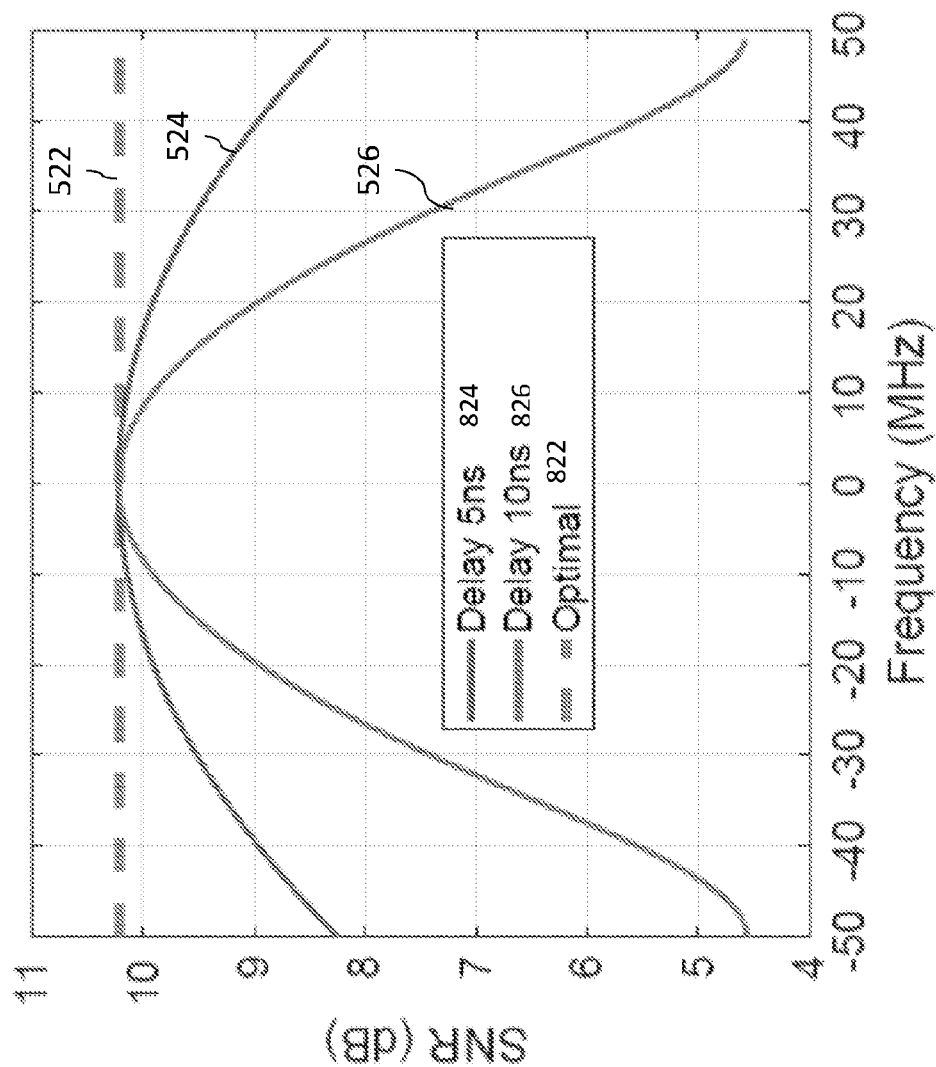
FIG. 5b illustrates an exemplary plot showing signal-to-noise power of a beamformer implementing the current subject matter's beamforming architecture and beamformers that do not implement such architecture across a range of frequencies.

The above multi-path beamformer may be configured to work with a wide range of frequencies. FIG. 5b illustrates an exemplary plot 520 showing SNR of beamformers implementing the above beamforming architecture ("Optimal" curve 522) and those that do not (curves 524 and 526) across a range of frequencies. The current subject matter's response ("Optimal") 522 is flat across all frequencies irrespective of any channel delay spread. The other curves 524 (corresponding to a 5 ns delay) and 526 (corresponding to a 10 ns delay) show loss of SNR at various frequencies (i.e., a wideband issue) when the current subject matter system, as described herein, is not implemented.

Figure 5C:
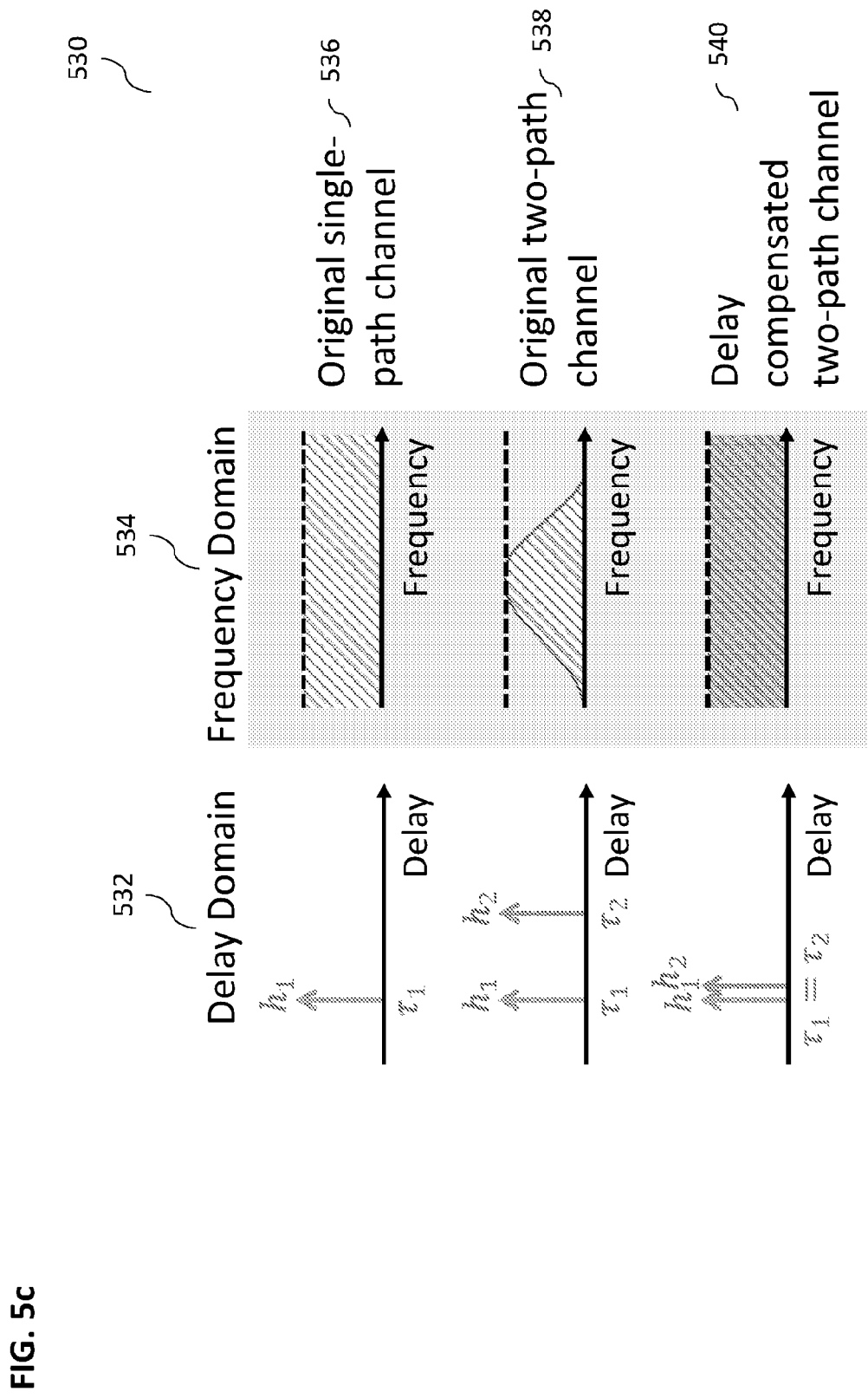

FIG. 5c is a schematic 530 that illustrates advantages of the delay compensation system 500 (shown in FIG. 5a). The schematic 530 compares delay domain 532 and frequency domain 534 responses for the single path channels 536 and two-path channels 538 without use of the delay compensation system 500 as well as the delay compensated two-path channel 540. As can be seen from FIG. 5c, a flat frequency response across the entire frequency spectrum is achieved despite presence of multi-path delays, which may be achieved by compensating for additional delays caused by the multi-path, thereby solving various wideband issues.

III. Proactive Multi-Beam Tracking

Once a constructive multi-beam is established, the current subject matter system (e.g., system 100 shown in FIG. 1) may be configured to maintain it over time to ensure reliable millimeter wave communication. One of the purposes of beam maintenance is to keep a high-throughput link even when the user equipment is mobile and/or a random blockage occurs. One of the options for beam maintenance may include periodically repeating the generation of constructive multi-beam processes discussed above so as to re-establish constructive multi-beam with a mobile user equipment. This may require repeating the beam-training phase, which may incur significant delays and probing overhead. In some implementations, it may be observed that the effects of blockage and/or mobility may be naturally embedded in a form of variations in a wireless channel. Thus, the current subject matter system may leverage OFDM channel estimate(s) and/or reference signaling to maintain a multi-beam link and avoid impending blockage and/or mobility events while the communication link is active.

Figure 6:
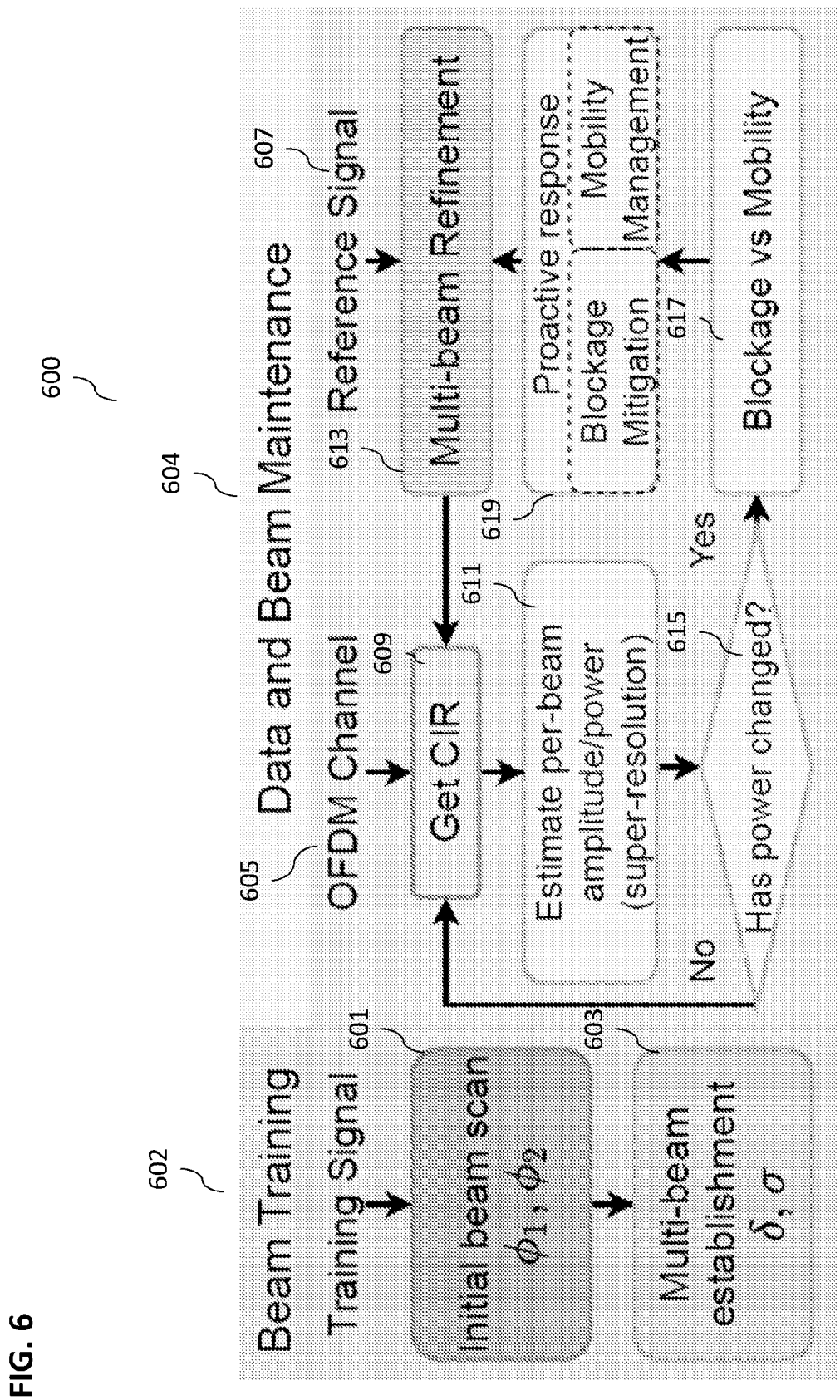
FIG. 6 illustrates an exemplary proactive multi-beam tracking process, according to some implementations of the current subject matter.

FIG. 6 illustrates an exemplary proactive multi-beam tracking process 600, according to some implementations of the current subject matter. The process 600 may include a beam training phase 602, which, in turn, may include an initial beam scan 601 (based on a training signal) and multi-beam establishment 603. The process 600 may also include a data and beam maintenance phase 604.

Phase 604 may use OFDM channel 605 monitoring and reference signal 607 input information. The OFDM channel 605 monitoring, along with multi-beam refinement 613 (based on the reference signal 607) may be used to determine channel impulse response (CIR) 609. This may be followed by per-beam determination of amplitude/power (super-resolution) 611. At 615, the current subject matter system may determine whether any power change may have occurred (e.g., due to user equipment mobility, blockages, etc.), if not, the process 600 may return to determination of CIR at 609. Otherwise, an evaluation 617 of may be performed to determine whether there was blockage(s) and/or user equipment mobility. A proactive response 619 may be executed, which may include a blockage mitigation and/or mobility management. Results of the proactive response 619 may be used to refine multi-beam at 613.

The process 600 may be used to continuously monitor the OFDM channel to identify blockage and/or user equipment mobility issues on a per-beam basis. User equipment mobility may be tracked in the background, and the multi-beam may be periodically refined with a low overhead. When the beam is no longer recoverable by tracking alone (e.g., due to accumulated errors in tracking over time), the current subject matter system may be configured to perform recalibration using the beam training phase 602. The following provides additional details of the process 600.

Mobile blockers may interact with the current subject matter system by, for example, suddenly occluding one or more active beams. The current subject matter system (e.g., system 100 as shown in FIG. 1) may be configured to analyze a rate of change of amplitude on per beam basis to detect such occluding events. For instance, a typical blockage events may cause per-beam amplitude to degrade by 10 dB in just 10 OFDM symbols. Once a blockage event is detected, current subject matter system may be configured to respond by repurposing the power on the blocked beam to other unblocked beams. As there are other multiple beams that may be active, there will not be a significant impact on link reliability, even if one of the beams is blocked. In particular, the transceiver of the base station in the current subject matter system may be configured to reduce a number of beams whenever blockage is detected along some paths. While it is rare that all paths may be blocked simultaneously, in case of a complete outage, the base station of the current subject matter system may be configured to initiate a new beam training phase to search for other alternate paths and/or perform a handover.

When the user equipment is mobile, an initial multi-beam might not be supported. For instance, an angular movement of 14 may cause a 20 dB loss in signal strength leading to an outage. While a natural solution is to perform a new beam training to locate a new user equipment position, beam training may cause a high overhead in a tedious scanning. By comparison, current subject matter system may be configured to proactively track user equipment mobility using one or more channel measurements and refine the beam periodically (at 613 as shown in FIG. 6).

In some implementations, current subject matter system may be configured to track each beam by observing one or more gradual changes in per-beam power. Per-beam angular deviation may be determined using per-beam power measurements, $P_k(t)$ using the following:

$$P_k(t) = G_T(\phi_k + \varphi_k(t)) + G_R + P_T - P_h \text{ (in dB)} \tag{19}$$

where $G_T(\phi_k + \varphi_k(t))$ and $G_R$ are transmit and receive gain respectively, where initial angle $\phi_k$ may change by $\varphi_k(t)$ over time, $P_T$ is a transmit power, and $P_h$ is power decay due to channel impairments. The difference $P_k(t_0) - P_k(0)$ may be used to determine a relative change in the per-beam power using the following:

$$P_k(t_0) - P_k(0) = G_T(\phi_k + \varphi_k(t_0)) - G_T(\phi_k) \tag{20}$$

where the above assumes that the channel loss $P_h$ (e.g., due to path loss and/or reflection loss) and receiver gain $G_R$ of an omni-user is static for a small duration of user equipment motion.

To estimate $\varphi_k(t_0)$, the current subject matter system may be configured to correlate the direct path power with the beam pattern at the base station, as a function of spatial angle, using the following:

$$G_T(\theta) = \frac{\sin(N\theta/2)}{N\sin(\theta)} \tag{21}$$

where N is a number of antennas in a uniform linear array and $\theta$ is a spatial angle.

An inverse function may be used to determine an angle from the measured per-beam power. However, as the beam pattern may typically be symmetric, and two possible values $\varphi(t_0)$ and $-\varphi(t_0)$ may have caused an observed change in $G_T$. To deal with the ambiguity of the direction of motion, the current subject matter system may be configured to use a reference signal probing to improve the SNR. If the probe does not improve the SNR, the current subject matter system may be configured to refine the beam to another angle (while assuming that that angle is correct). The refinement may add an overhead of only one additional probe in addition to 2(K−1) probes that may be needed for a constructive multi-beam for the K-beam case. The current subject matter system may further be configured to periodically estimate the value of the per-beam angle, phase, and/or amplitude and update the beam pattern at the base station to realign towards the user equipment.

In some implementations, the current subject matter may be configured to perform per-beam tracking (at 611 as shown in FIG. 6). In particular, a per-beam power required for the beam tracking process may be determined as part of this operation. In particular, the per-beam power may be determined using the channel impulse response (CIR) of the current multi-beam in the background without any scanning. When receiving a multi-beam transmission, the signal at the base station receiver may include a superposition of a delayed and attenuated version of each individual transmit beam. Using the delay and attenuation experienced by beam-index k as $\delta_k$ and $\alpha_k$, respectively, the effective multi-beam channel may be determined using the following:

$$h_{eff} = \sum_k \alpha_k \delta(t - \tau_k) \tag{22}$$

where $\alpha_k$ is a function of the transmitter and receiver beam pattern, while $\delta_k$ relates to the time of flight (ToF) of each multi-beam channel path. The current subject matter system may then determine individual $\alpha_k$ for each beam (k=1, 2 . . . , K).

In some implementations, for a frequency-selective wideband system, the received signal may be sampled at sampling rate and sinc interpolated due to limited bandwidth using the following:

$$h_{eff}[n] = \sum_k \alpha_k \text{sinc}(B(nT_s - \tau_k)) \tag{23}$$

where B is the bandwidth, $T_s$ is the sampling rate of the receiver, and or is total signal attenuation along path k.

Equation (23) may be rewritten to determine $\sigma$ such that it fits a particular channel.

Assuming that the collected CIR is represented by column vector $h_{CIR}$, the following may be used to determine $\alpha = [\alpha_1 \alpha_2 \ldots \alpha_K]^T$, which is the amplitude per beam:

$$\alpha_{est} = \arg\min_\alpha \|h_{CIR} - S\alpha\|^2 + \lambda\|\alpha\|^2 \tag{24}$$

where the matrix S includes all the ToF.

A super-resolution problem may be solved by fitting a sinc model over the entire CIR response. The current subject matter may also assume that, after training, the absolute ToF may have changed, but the relative ToF may change slowly. The $h_{CIR}$ may be shifted first so that the strongest path is shifted to zero delays and since relative to the first path, the delay of the second and third path may be known. The S matrix may be populated with only a few columns, thereby achieving accurate and reliable solutions to a %. Small variations in relative-ToF may be accounted for by trying one or more values around the initial value that best fits the model. Thus, an accurate super-resolution may leverage an initial relative-ToF information between the multi-beams.

Figure 7B:
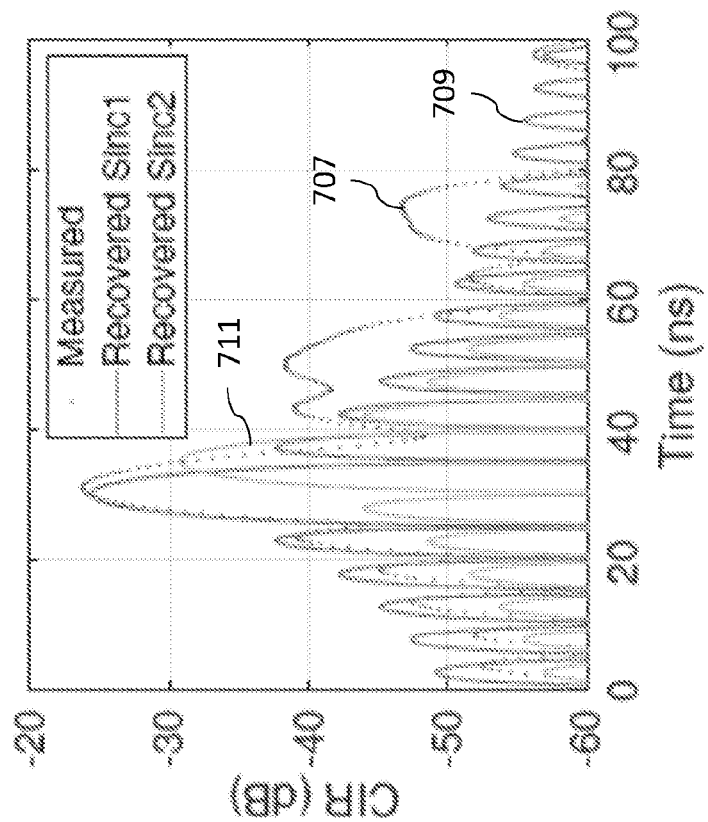
FIG. 7b illustrates exemplary plots showing experimental channel impulse response measurements and recovered sinc response models.
Figure 7A:
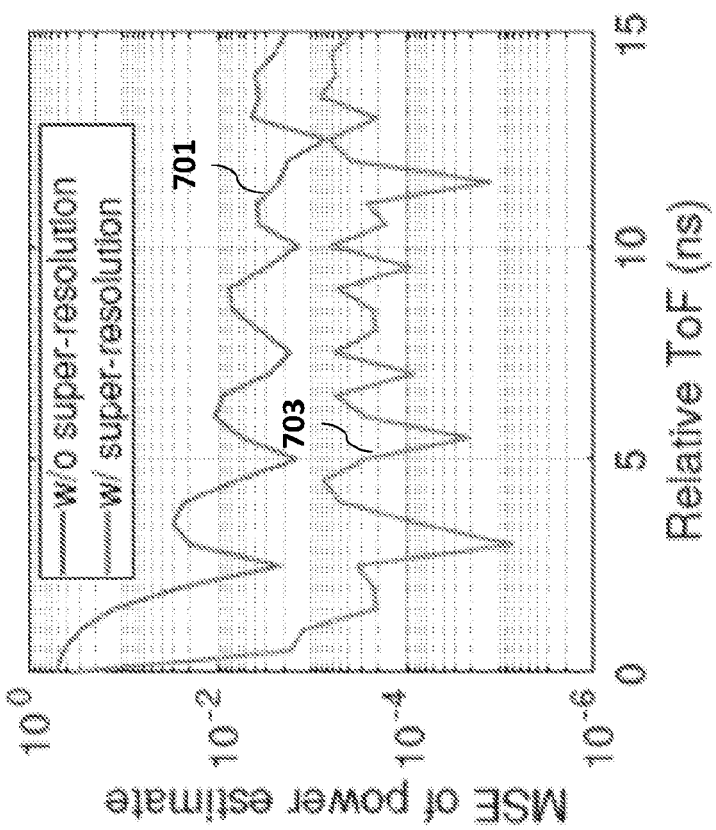
FIG. 7a illustrates exemplary plots of power estimates in relation to the relative time of flight without super-resolution and power estimates in relation to the relative time of flight with super resolution.

FIG. 7a illustrates an exemplary plot 702 showing effectiveness of the above super-resolution process in achieving a high resolution for estimating per-beam amplitude even when the relative ToF is lower than what corresponds to the resolution (e.g., 2.5 ns for 400 MHz bandwidth). As shown in FIG. 7a, curve 701 illustrates power estimates in relation to the relative time of flight without super-resolution and curve 703 illustrates power estimates in relation to the relative time of flight with super resolution. FIG. 7b illustrates an exemplary plot 704 showing experimental channel impulse response measurements (curve 707) and recovered sinc (curve 709 for sinc1 and curve 711 for sinc2) models. For this experimental implementation, a 7 m link with a reflector placed at 30° was used.

In some implementations, while the above discussion illustrates use of the current subject matter in connection with a quasi-omni beam pattern at the user equipment (UE), and directional beams may be needed at the UE side whenever the SNR may be low, e.g., for longer outdoor links, the current subject matter system may also be used where the UEs have directional beams. In this case, the current subject matter system may be configured to implement the concepts above, e.g., super-resolution, proactive tracking, etc., to mitigate a multi beam link against outages due to blockages, mobility, etc., thereby addressing the new system level challenges posed by directional UEs.

Figures 8A, 8B:
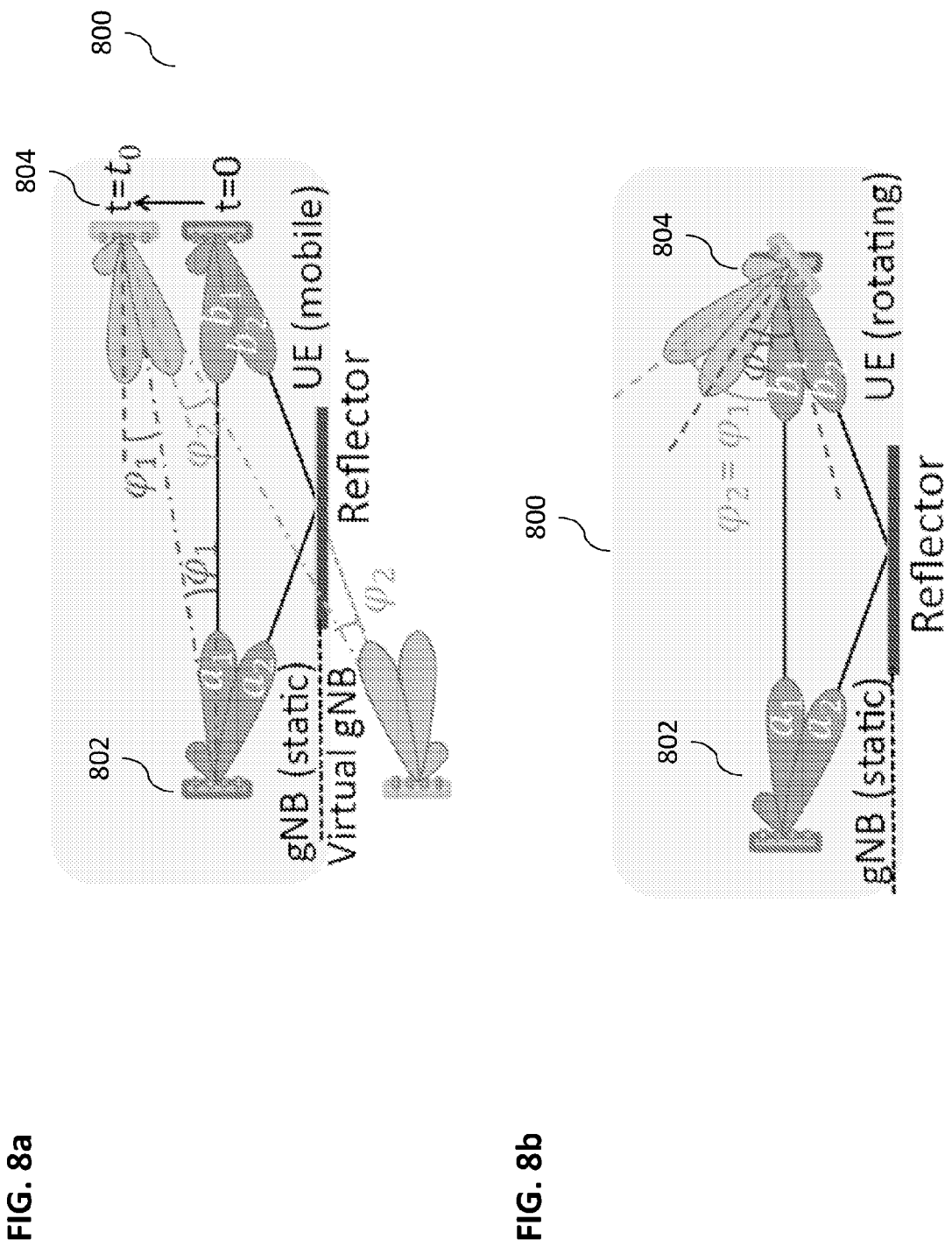
FIG. 8a illustrates an exemplary wireless communication environment showing user equipment translation.
FIG. 8b an exemplary wireless communication environment showing user equipment rotation.

FIGS. 8a-b illustrate a wireless communication environment 800 (FIG. 8a—for a case of user translation and FIG. 8b—for a case of user rotation), where a direction user equipment 804 may be configured to move from t=0 to t=t₀. In this case, the two beams at the base station 802 may be misaligned by $\varphi_1$, $\varphi_2$ angle differences respectively. A similar misalignment may be observed at the UE side as well. If the UE 804 and the base station 802 are able to estimate these misalignment angles, they may compensate for the UE mobility by realigning the beams $a_1$, $b_1$, and moving them $\varphi_1$, $-\varphi_1$, respectively, and $a_2$, $b_2$ may be realigned by $-\varphi_2$, $\varphi_2$, respectively. Along with estimation of $\varphi_1$, $\varphi_2$, this step may also require association of beams $a_1$, $b_1$ and $a_2$, $b_2$, since there could be erroneous solutions by associating $a_1$, $b_2$ or $a_2$, $b_1$ together. Hence, handling UE mobility may involve (1) correctly associating one multi beam to the other, and then (2) determining the misalignment angles. The first problem may solved as a corollary of the super-resolution algorithm, which may allow per path CIR resolution. By utilizing the unicity of ToF, two per path CIRs may be associated, thereby associating the two beams which are along these respective paths.

In order to mitigate against the misalignments due to user equipment mobility, the current subject matter system may be configured to repeatedly estimate and compensate for the misalignment angles. For estimation of the misalignment angles, individual models for tracking translation and/or rotation may be used (e.g., using equation (20)). The rotation of UE beam may cause changes in UE antenna gain from which the angle of rotation may be estimated using an inverse function (as shown and discussed in connection with FIGS. 8a-b). The translation case (FIG. 8a) may cause changes in both the base station's and UE's antenna gain. The received power in this case may be equal to the sum of the two antenna gains. To estimate the angle in this case, an observation that the beams at the base station and the UE get misaligned by the same angle (as shown and discussed in connection with FIGS. 8a-b) may be leveraged. This angle may be determined by inverting a sum of the beam patterns at the base station and UE. This way, user motion may be tracked and beams may be proactively refined.

In some implementations, constructive multi-beam (as discussed above) may be optimal for SNR and throughput for general k-path channel. The following equation may be used to design phase-coherent multi-beam patterns which exploit B channel directions out of L paths:

$$w^{multi} = \frac{\sum_{b=0}^{B-1} a^*(\phi_b) Yb e^{j\sigma_b}}{\left\| \sum_{b=0}^{B-1} a^*(\phi_b) Yb e^{j\sigma_b} \right\|} \quad (25)$$

In the above, all B beams in the multi-beam may be oriented along the B strongest paths in the channel. The multi-beam patterns may ensure that per-beam amplitude $\gamma_b$ and phase Ob (averaged over all frequency subcarriers) may be aligned with per-path channel attenuation and phase respectively. Thus, when B=L, the multi-beam patterns are oriented along all the paths in a multi-path channel. In this case, the multi-beam weights may be the same as the optimal weights:

$$w^{multi} = w^{opt}, \text{ when } B=L. \quad (26)$$

Thus, a multi-beam pattern utilizes B out of Z channel paths to improve the SNR as follows:

$$SNR^{multi} = \frac{\sum_{b=0}^{B-1} \|\gamma b\|^2 P_s}{P_\eta} \quad (27)$$

The above may converge to optimal SNR for B=L. The capacity of multi-beam link may be rewritten as follows:

$$C_{mb} = \log_2(1 + SNR^{multi}) \quad (28)$$

The optimal maximum likelihood beamformer may require per-antenna channel estimate which may have a high complexity in terms of beam probing overhead. Thus, since mmWave channel is sparse and there are only 1 or 2 strong reflected paths in addition to the direct path, the multi-beam with 2-3 beams may provide SNR gain comparable to the optimal beam with significantly lower overhead.

EXEMPLARY EXPERIMENTAL IMPLEMENTATION

An exemplary experimental current subject matter system was built using 28 GHz mmWave testbed to evaluate its performance. The experimental system included the following components: (i) an 8×8 mmWave phased array (PA) with real-time beamforming, and (ii) a baseband module that generates and processes standard-compliant OFDM waveforms. The testbed further included the following components: (i) baseband processing module: Gsps digital and analog front-end unit, which was connected to the host computing device, (ii) IF module: connected with the baseband processing module and included a mixer and a 15 dB LNA, (iii) Tx/Rx module: connected to the IF module and included up-down converters and Tx/Rx transceivers, which were connected to the phased array antennas, and the DC beam control board. A 28 GHz horn antenna was used for antenna calibration and measuring beam patterns.

The baseband module generated OFDM waveforms with 400 MHz effective bandwidth. The host PC handled pre/post data processing and waveform generation. The complex baseband conjugate symmetrically was digitally encoded in both the upper and lower sidebands to create a real baseband signal compatible with the mixer. After the IF stage, the lower sideband is rejected using a high pass filter. Thus, the module may generate complex baseband signals with a bandwidth of half the sampling rate. The bandwidth achieved is representative of real-life implementations, e.g., 5G-NR. In the baseband reception, the module may performs a digital frequency transform and then reject negative frequencies to retrieve complex baseband information. The IF module converted the baseband signal to IF and vice versa. The output of the mixer is high pass filtered to reject the image caused due to single-channel upconversion. The down-conversion side of the module is fed to an LNA and had no special filter. The Tx/Rx module included an external LO running at 12.25 GHz and a frequency doubler, producing a 24.5 GHz clock. The output of the IF stage is up/down-converted directly using the clock to generate an RF signal at 27.9 GHz of FR2. The upconverter chain drove the TX phased array antenna while the RX phased array antenna was driven by the downconverter chain. A DC board regulated the currents and voltages of the phased array and communicates with the 8×8 beamformer ICs.

The performance of the current subject matter's system was evaluated in two indoor and outdoor settings: a large 7 m×10 m conference room occupied with wooden furniture, whiteboard, and reflective glass walls, and an outdoor 30 m-80 m link next to large building with glass walls. The experimental current subject matter system demonstrated a significant improvement in reliability (e.g., based on user translation and/or rotation experiments to emulate practical occurrences in environments). As the user moves, a human blocker was introduced midway between transmit (Tx) and receive (Rx), blocking the link for a duration chosen uniformly between 100 ms to 500 ms, over 1 sec experiments. Several experiments (e.g., 100) were performed and the results were combined to form one point, and various user mobility and blockage pattern across two indoor environments were tracked. The current subject matter's system achieved close to 100% reliability. Further, the current subject matter's system did not suffer from throughput loss, while the conventional systems suffer from such throughput degradation due to user's mobility. The experimental results indicate that the current subject matter's system delivers an average throughput of 200 Mbps more than that achieved by the reactive baseline (average of 400 Mbps), 50% more throughput than reactive baseline. More importantly, the current subject matter's system offers a uniform throughput with low variations compared to the baseline, essential to many mission-critical applications. Thus, the current subject matter's system achieved a high-reliability link similar to sub-6 GHz communication while taking advantage of mmWave high data rates. Further, an average reliability is 1 for the current subject matter's system, compared to conventional systems whose reliability is 0.65. The evaluation revealed that the current subject matter's system is advantageous over throughput-based design on both throughput and reliability.

Figure 9:
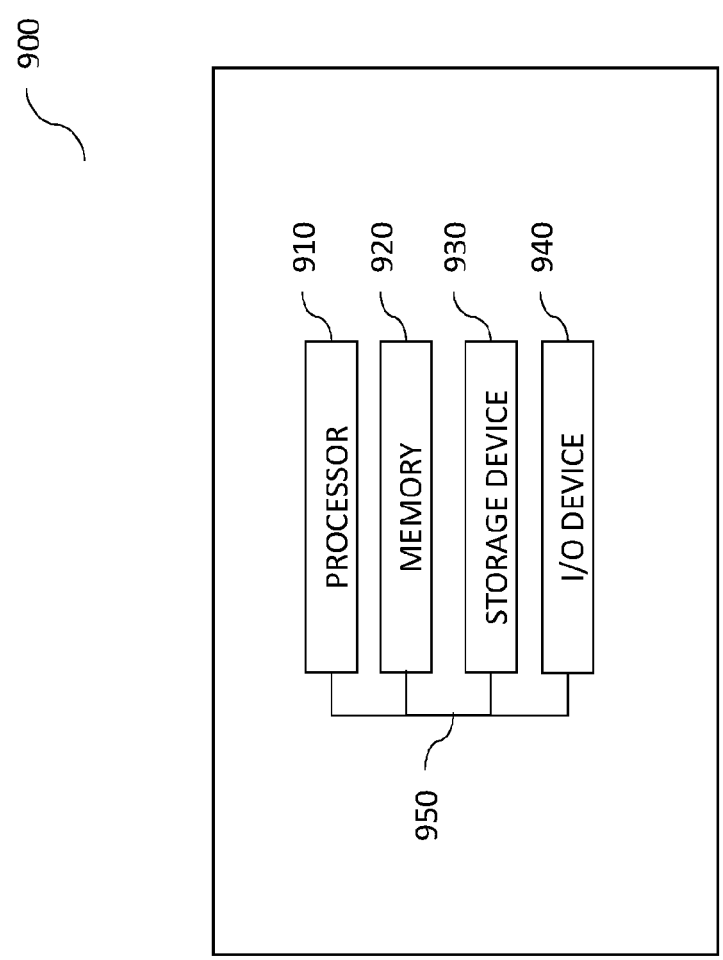
FIG. 9 illustrates an exemplary system, according to some implementations of the current subject matter.

In some implementations, the current subject matter can be configured to be implemented and/or operating in connection with a computing system 900, as shown in FIG. 9. The system 900 can include a processor 910, a memory 920, a storage device 930, and an input/output device 940. Each of the components 910, 920, 930 and 940 can be interconnected using a system bus 950. The processor 910 can be configured to process instructions for execution within the system 900. In some implementations, the processor 910 can be a single-threaded processor. In alternate implementations, the processor 910 can be a multi-threaded processor. The processor 910 can be further configured to process instructions stored in the memory 920 or on the storage device 930, including receiving or sending information through the input/output device 940. The memory 920 can store information within the system 900. In some implementations, the memory 920 can be a computer-readable medium. In alternate implementations, the memory 920 can be a volatile memory unit. In yet some implementations, the memory 920 can be a non-volatile memory unit. The storage device 930 can be capable of providing mass storage for the system 900. In some implementations, the storage device 930 can be a computer-readable medium. In alternate implementations, the storage device 930 can be a floppy disk device, a hard disk device, an optical disk device, a tape device, non-volatile solid state memory, or any other type of storage device. The input/output device 940 can be configured to provide input/output operations for the system 900. In some implementations, the input/output device 940 can include a keyboard and/or pointing device. In alternate implementations, the input/output device 940 can include a display unit for displaying graphical user interfaces.

Figure 10:
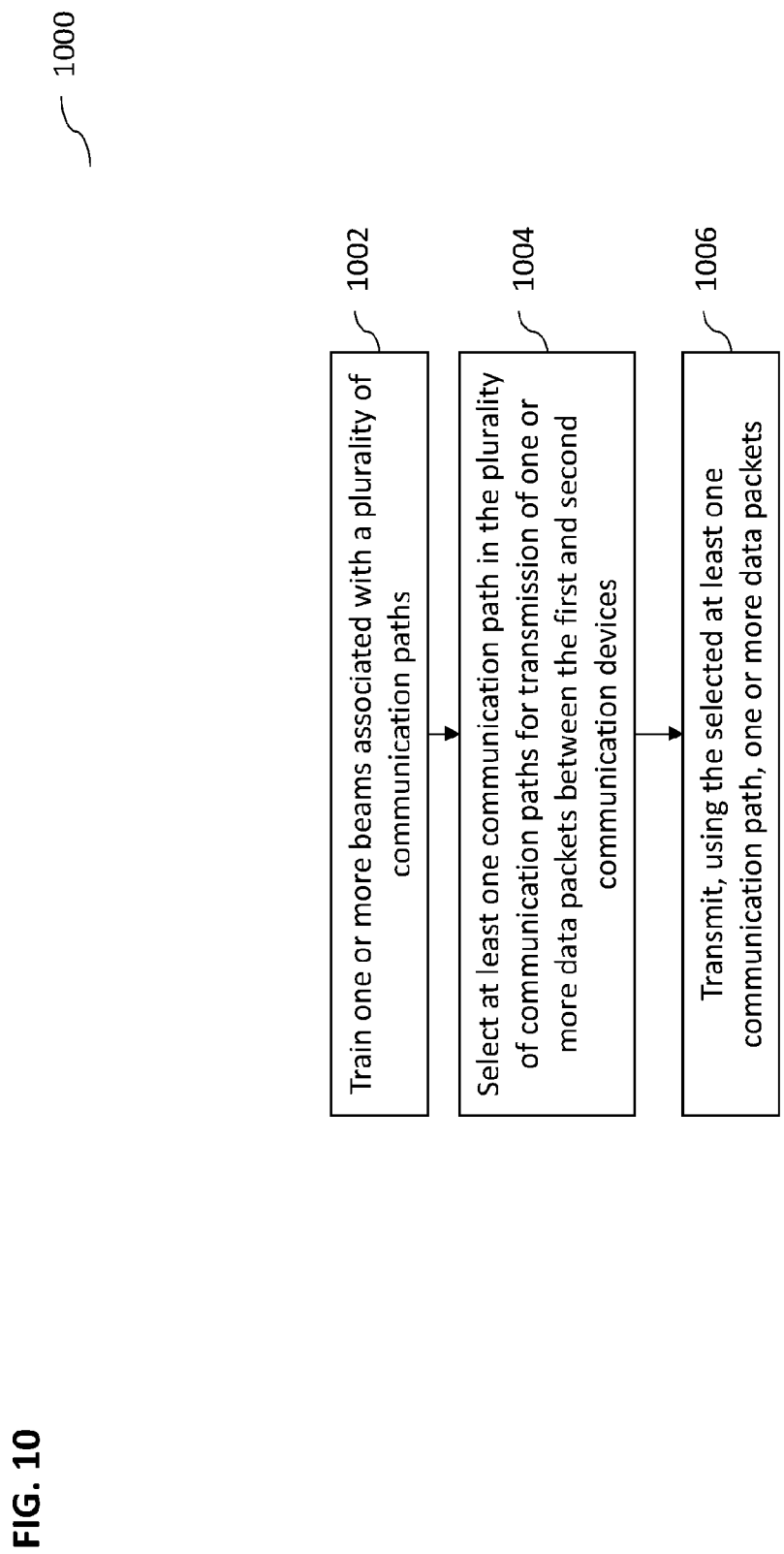
FIG. 10 illustrates an exemplary method, according to some implementations of the current subject matter.

FIG. 10 illustrates an exemplary process 1000 for enabling reliable millimeter links in wireless communications systems, according to some implementations of the current subject matter. The process 1000 may be performed using the system 100 (as shown in FIG. 1) and discussed in connection with FIGS. 1-8b above. At 1002, one or more beams associated with a plurality of communication paths may be trained to determine one or more angles corresponding to the beams at which the beams are received by at least one of a first communication device and a second communication device (e.g., devices 102, 104 as shown in FIG. 1). The training may be performed as discussed in connection with FIGS. 2 and 4-6.

At 1004, using the determined one or more angles and at least one of a phase and an attenuation associated with one or more trained beams, at least one communication path in the plurality of communication paths may be selected for transmission of one or more data packets between the first and second communication devices. The selection may be made based on a maximum signal-to-noise (SNR) power, as discussed above with regard to FIGS. 3a-e. At 1006, one or more data packets may be transmitted using the selected communication path.

In some implementations, the current subject matter may include one or more of the following optional features. The plurality of communication paths may include at least one of the following: a direct communication path, a reflected communication path, a repeater path, a relay path, a reflecting surface, a smart reflecting surface, and any combination thereof. The reflected communication path may be configured to be established between the first communication device, the second communication device and at least one reflector device, where the reflector device may be configured to reflect at least one beam from at least one of the first and second communication devices for receipt by at least another one of the first and second communication devices.

In some implementations, the first and second communication devices may include at least one of the following: a user equipment, a base station, an antenna, and any combination thereof. In some implementations, the plurality of communication paths may be configured to be established in a wireless communication system.

In some implementations, the training operation may be configured to be performed based on at least one of the following: a rotational movement of at least one of the first and second communication devices, a translational movement of at least one of the first and second communication devices, a blocking object positioned between the first and second communication devices, and any combination thereof. The training may include at least one of the following: adjusting a power associated with the one or more beams, adjusting a phase associated with the one or more beams, adjusting a delay associated with the one or more beams, and any combination thereof.

In some implementations, the selecting operation may include selecting a first plurality of communication paths in the plurality of communication paths. The method may also include combining signals transmitted in each of the communication paths in the first plurality of communication paths as received at at least one of the first and second communication devices.

In some implementations, the selecting may also include determining one or more beamforming weights for maximizing a signal-to-noise power associated with each of one or more communication paths in the plurality of communication paths, where the beamforming weights may be determined using a transmit power and a noise power associated with each of communication paths and may be determined using the associated delay, phase and/or attenuation. The selecting may further include selecting the communication path having a maximum signal-to-noise power.

In some implementations, the first and second communication devices may be communicating using a millimeter wave.

In some implementations, the method may further include detecting, at least one of the first and second communication devices, a loss of a signal associated with one or more trained beams, and determining, based on the detected loss of the signal, a location of at least another of the first and second communication devices, as discussed above in connection with FIGS. 7a-b illustrating the super-resolution process for tracking devices. The loss of the signal may be determined based on a change in at least one of an amplitude, a phase and a delay associated with the one or more trained beams.

In some implementations, at least one of the first and second communication devices is configured to generate the one or more beams. For example, one or both of the base station and the user equipment may generate beams as well as perform the processes discussed herein.

In some implementations, each communication path in the plurality of communication paths may be associated with a delay. The transmission of data packets may be performed by compensating the delay associated with each communication path (as for example, discussed above with regard to FIGS. 5a-c). The delay may be a variable delay.

In some implementations, at least one of the first and second communication devices may include a phased array antenna device (e.g., as shown in FIGS. 3a-e) configured to perform at least one of the following: the training, the selecting, the transmitting of the data packets, a receiving of the data packets, and any combination thereof. These operations may be performed using at least one of the following parameters: a variable delay, a constant delay, a variable attenuation, a constant attenuation, a variable phase, a constant phase, and any combination thereof. The phased array antenna device may include one or more phased array antennas, one or more variable attenuators, and variable phase shifters, the variable phase shifters being communicatively coupled to a radio frequency signal.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively, or additionally, store such machine instructions in a transient manner, such as for example, as would a processor cache or other random access memory associated with one or more physical processor cores.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed:

1. A computer-implemented method comprising:
   training one or more beams associated with a plurality of communication paths to determine one or more angles corresponding to the one or more beams at which the one or more beams are received by at least one of a first communication device and a second communication device;
   selecting, using the determined one or more angles, at least one communication path in the plurality of communication paths for transmission of one or more data packets between the first and second communication devices, wherein the selecting further comprises determining one or more beamforming weights for maximizing a signal-to-noise power associated with each of one or more communication paths in the plurality of communication paths, the one or more beamforming weights determined using a transmit power and a noise power associated with the each of one or more communication paths and selecting the at least one communication path having a maximum signal-to-noise power; and
   transmitting, using the selected at least one communication path, one or more data packets.

2. The method according to claim 1, wherein the selecting is performed using at least one of a phase and an attenuation associated with one or more trained beams.

3. The method of claim 1, wherein the plurality of communication paths includes at least one of the following: a direct communication path, a reflected communication path, a repeater path, a relay path, a reflecting surface, a smart reflecting surface, and any combination thereof.

4. The method according to claim 3, wherein the reflected communication path is configured to be established between the first communication device, the second communication device and at least one reflector device, wherein the at least one reflector device is configured to reflect at least one beam in the one or more beams from at least one of the first and second communication devices for receipt by at least another one of the first and second communication devices.

5. The method of claim 1, wherein the first and second communication devices include at least one of the following: a user equipment, a base station, an antenna, and any combination thereof.

6. The method of claim 1, wherein the plurality of communication paths are configured to be established in a wireless communication system.

7. The method of claim 1, wherein the training is configured to be performed based on at least one of the following: a rotational movement of at least one of the first and second communication devices, a translational movement of at least one of the first and second communication devices, a blocking object positioned between the first and second communication devices, and any combination thereof.

8. The method of claim 1, wherein the training includes at least one of the following: adjusting a power associated with the one or more beams, adjusting a phase associated with the one or more beams, adjusting a delay associated with the one or more beams, and any combination thereof.

9. The method of claim 1, wherein the selecting includes selecting a first plurality of communication paths in the plurality of communication paths.

10. The method according to claim 9, further comprising combining signals transmitted in each of the communication paths in the first plurality of communication paths as received at least one of the first and second communication devices.

11. The method of claim 1, wherein the one or more beamforming weights are determined using at least one of the associated delay, phase and attenuation.

12. The method of claim 1, wherein the first and second communication devices are communicating using a millimeter wave.

13. The method of claim 1, further comprising
   detecting, using at least one of the first and second communication devices, a loss of a signal associated with the one or more trained beams, wherein the loss of the signal is determined based on a change in at least one of an amplitude, a phase and a delay associated with the one or more trained beams; and
   determining, based on the detected loss of the signal, a location of at least another of the first and second communication devices.

14. The method of claim 1, wherein at least one of the first and second communication devices is configured to generate the one or more beams, and perform at least one of the training, the selecting, and the transmitting.

15. The method of claim 1, wherein each communication path in the plurality of communication paths is associated with a delay, wherein the transmitting is performed by compensating for the delay associated with each communication path.

16. The method according to claim 15, wherein the delay is a variable delay.

17. The method of claim 1, wherein at least one of the first and second communication devices includes a phased array antenna device configured to perform at least one of the following: the training, the selecting, the transmitting of the one or more data packets, the receiving of the one or more data packets, and any combination thereof, using at least one of the following parameters: a variable delay, a constant delay, a variable attenuation, a constant attenuation, a variable phase, a constant phase, and any combination thereof.

18. The method according to claim 17, wherein the phased array antenna device includes one or more phased array antennas, one or more variable attenuators, and variable phase shifters, the variable phase shifters being communicatively coupled to a radio frequency signal.

19. A system comprising:
   at least one programmable processor; and
   a non-transitory machine-readable medium storing instructions that, when executed by the at least one programmable processor, cause the at least one programmable processor to perform operations comprising:
   training one or more beams associated with a plurality of communication paths to determine one or more angles corresponding to the one or more beams at which the one or more beams are received by at least one of a first communication device and a second communication device;
   selecting, using the determined one or more angles, at least one communication path in the plurality of communication paths for transmission of one or more data packets between the first and second communication devices, wherein the selecting further comprises determining one or more beamforming weights for maximizing a signal-to-noise power associated with each of one or more communication paths in the plurality of communication paths, the one or more beamforming weights determined using a transmit power and a noise power associated with the each of one or more communication paths and selecting the at least one communication path having a maximum signal-to-noise power; and transmitting, using the selected at least one communication path, one or more data packets.

20. The system according to claim 19, wherein the selecting is performed using at least one of a phase and an attenuation associated with one or more trained beams.

* * * * *